(12) United States Patent
Nakamura et al.

(10) Patent No.: US 9,046,351 B2
(45) Date of Patent: Jun. 2, 2015

(54) LASER SPOTTING DEVICE FOR BICYCLE FITTING AND BICYCLE FITTING SYSTEM

(71) Applicant: SHIMANO INC., Sakai (JP)

(72) Inventors: Yasushi Nakamura, Sakai (JP); Hisataka Takada, Sakai (JP)

(73) Assignee: SHIMANO INC., Osaka (JP)

( * ) Notice: Subject to any disclaimer, the term of this patent is extended or adjusted under 35 U.S.C. 154(b) by 39 days.

(21) Appl. No.: 13/968,431

(22) Filed: Aug. 16, 2013

(65) Prior Publication Data

US 2015/0049344 A1    Feb. 19, 2015

(51) Int. Cl.
*G01B 11/14*    (2006.01)

(52) U.S. Cl.
CPC ..................... *G01B 11/14* (2013.01)

(58) Field of Classification Search
USPC ......................................................... 356/614
See application file for complete search history.

(56) References Cited

U.S. PATENT DOCUMENTS

| | | | | |
|---|---|---|---|---|
| 4,432,144 A * | 2/1984 | Carlsson | ................ | 33/608 |
| 4,630,379 A * | 12/1986 | Wickmann et al. | ............ | 33/288 |
| 4,889,425 A * | 12/1989 | Edwards et al. | ............ | 356/141.3 |
| 5,090,803 A * | 2/1992 | Ames et al. | ............... | 356/139.03 |
| 5,148,377 A * | 9/1992 | McDonald | ............... | 702/95 |
| 5,444,505 A * | 8/1995 | Dorsey-Palmateer | .......... | 353/28 |
| 5,737,073 A * | 4/1998 | Wente et al. | ............ | 356/139.09 |
| 6,049,378 A * | 4/2000 | Busch et al. | .................. | 356/138 |
| 6,128,585 A * | 10/2000 | Greer | ............................ | 702/104 |
| 6,374,507 B1 * | 4/2002 | Lehto | ................................ | 33/645 |
| 6,628,378 B1 * | 9/2003 | Marangoni et al. | ........... | 356/150 |
| 6,763,597 B2 * | 7/2004 | Lysen | ............................ | 33/286 |
| 6,839,976 B2 * | 1/2005 | Winkenbach et al. | .......... | 33/549 |
| 6,889,441 B2 * | 5/2005 | Seiffert | .......................... | 33/286 |
| 7,113,878 B1 * | 9/2006 | Loferer et al. | ................ | 702/104 |
| 7,346,847 B2 * | 3/2008 | Etter et al. | ...................... | 715/740 |
| 7,708,204 B2 * | 5/2010 | Hamar | ..................... | 235/462.11 |
| 7,710,554 B2 * | 5/2010 | Rockseisen | ............... | 356/141.3 |
| 2006/0075867 A1 * | 4/2006 | Etter et al. | ................. | 83/522.11 |
| 2013/0286405 A1 * | 10/2013 | Cagle | ............................ | 356/601 |

* cited by examiner

*Primary Examiner* — Roy M Punnoose
(74) *Attorney, Agent, or Firm* — Mori & Ward, LLP

(57) ABSTRACT

A laser spotting device for bicycle fitting comprises a base member and a laser emitting device movably attached to the base member in a first direction. The laser emitting device is configured to emit laser beam toward a first virtual plane which is parallel to the first direction and configured to emit laser beam toward a second virtual plane which is parallel to the first direction and which differs from the first virtual plane.

17 Claims, 19 Drawing Sheets

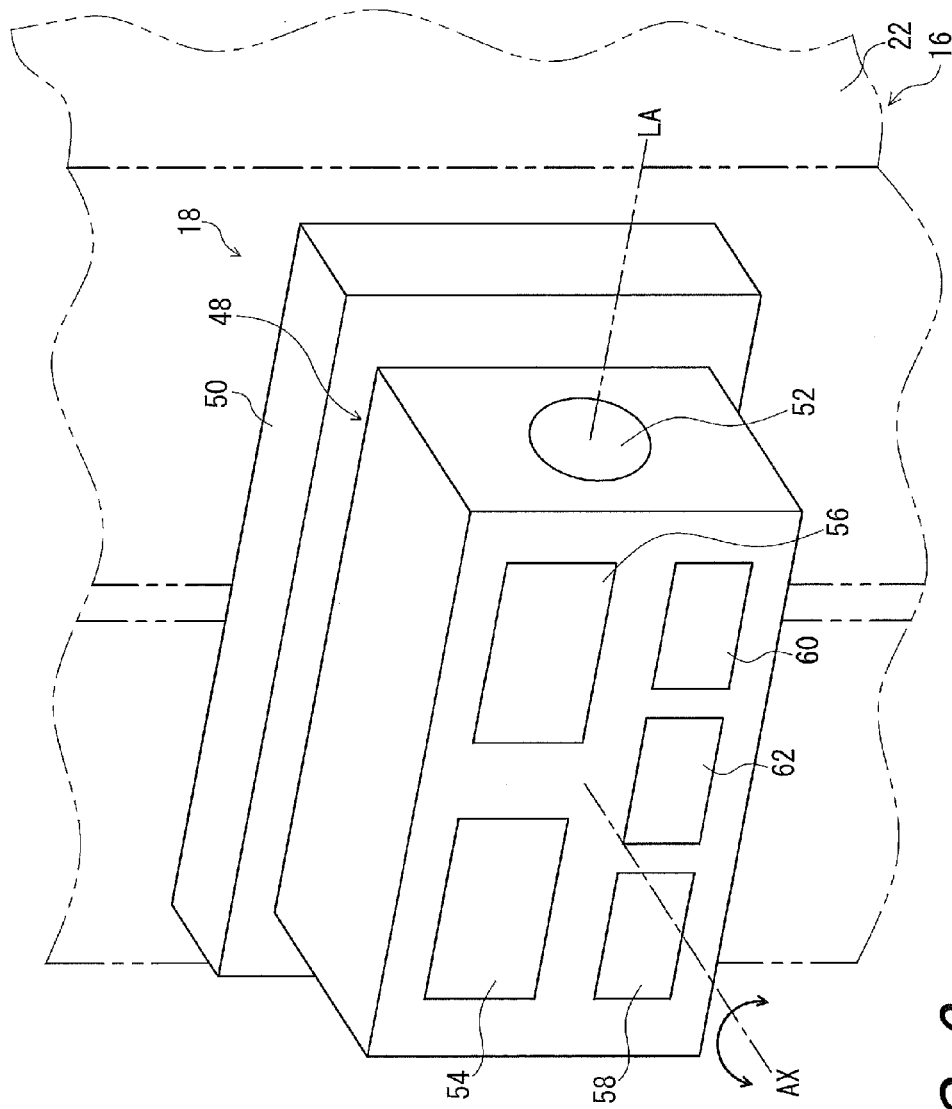
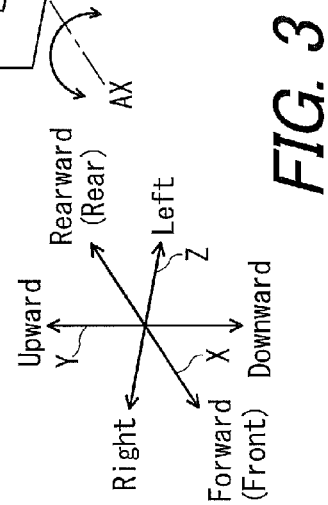
FIG. 3

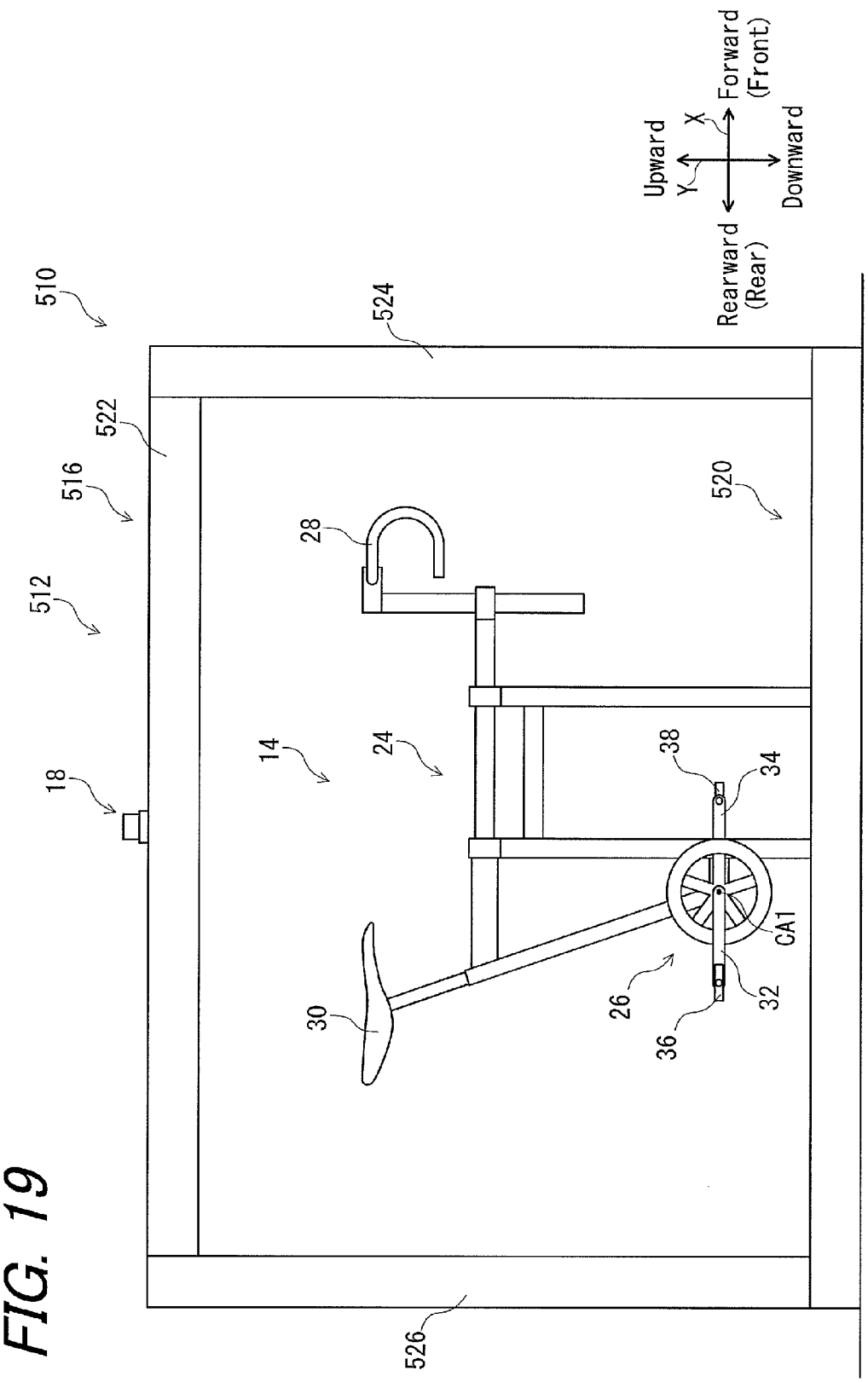

LASER SPOTTING DEVICE FOR BICYCLE FITTING AND BICYCLE FITTING SYSTEM

BACKGROUND OF THE INVENTION

1. Field of the Invention

The present invention relates to a laser spotting device for bicycle fitting and a bicycle fitting system.

2. Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle.

In recent years, a bicycle fitting technique has been developed to improve comfort or efficient riding. With the bicycle fitting technique, the preferable positions of the adjustable bicycle components are measured and applied to object bicycles. For example, laser spotting devices have been used to measure the preferable positions or to apply the measured preferable positions to the object bicycles.

SUMMARY OF THE INVENTION

In accordance with a first aspect of the present invention, a laser spotting device for bicycle fitting comprises a base member and a laser emitting device movably attached to the base member in a first direction. The laser emitting device is configured to emit laser beam toward a first virtual plane which is parallel to the first direction and configured to emit laser beam toward a second virtual plane which is parallel to the first direction and which differs from the first virtual plane.

In accordance with a second aspect of the present invention, the laser spotting device according to the first aspect is configured so that the base member includes a first part and a second part movably attached to the first part in a second direction which is perpendicular to the first direction. The laser emitting device is attached to the second part.

In accordance with a third aspect of the present invention, the laser spotting device according to the first aspect further comprises a detecting device configured to detect coordinates of the laser emitting device from initial coordinates of the laser emitting device.

In accordance with a fourth aspect of the present invention, the laser spotting device according to the third aspect is configured so that the detecting device is configured such that the initial coordinates are resettable.

In accordance with a fifth aspect of the present invention, the laser spotting device according to the first aspect is configured so that the laser emitting device includes a first laser emitter and a second laser emitter. The first laser emitter is configured to emit laser beam toward the first virtual plane. The second laser emitter is configured to emit the laser beam toward the second virtual plane.

In accordance with a sixth aspect of the present invention, the laser spotting device according to the fifth aspect is configured so that the second laser emitter is configured to emit laser beam in a direction opposite to a direction in which the first laser emitter emits laser beam.

In accordance with a seventh aspect of the present invention, the laser spotting device according to the first aspect is configured so that the laser emitting device includes a laser emitter and a carrier. The laser emitter has a laser output portion. The carrier is configured to movably attach the laser emitter to the base member. The carrier is configured to change orientation of the laser output portion relative to the carrier such that the laser emitter emits laser beam toward each of the first virtual plane and the second virtual plane.

In accordance with an eighth aspect of the present invention, the laser spotting device according to the seventh aspect is configured so that the carrier is configured to change the orientation of the laser output portion between a first orientation and a second orientation which is opposite to the first orientation.

In accordance with a ninth aspect of the present invention, a bicycle fitting system comprises the laser spotting device according to the first aspect, and an adjustable stationary cycling machine connected to the base member of the laser spotting device and arranged at the first virtual plane.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a partial perspective view of the laser spotting device illustrated in FIG. 1;

FIG. 19 is a side elevational view of a bicycle fitting system with a laser spotting device in accordance with a fifth embodiment of the present invention.

DESCRIPTION OF THE EMBODIMENTS

Figure 1:
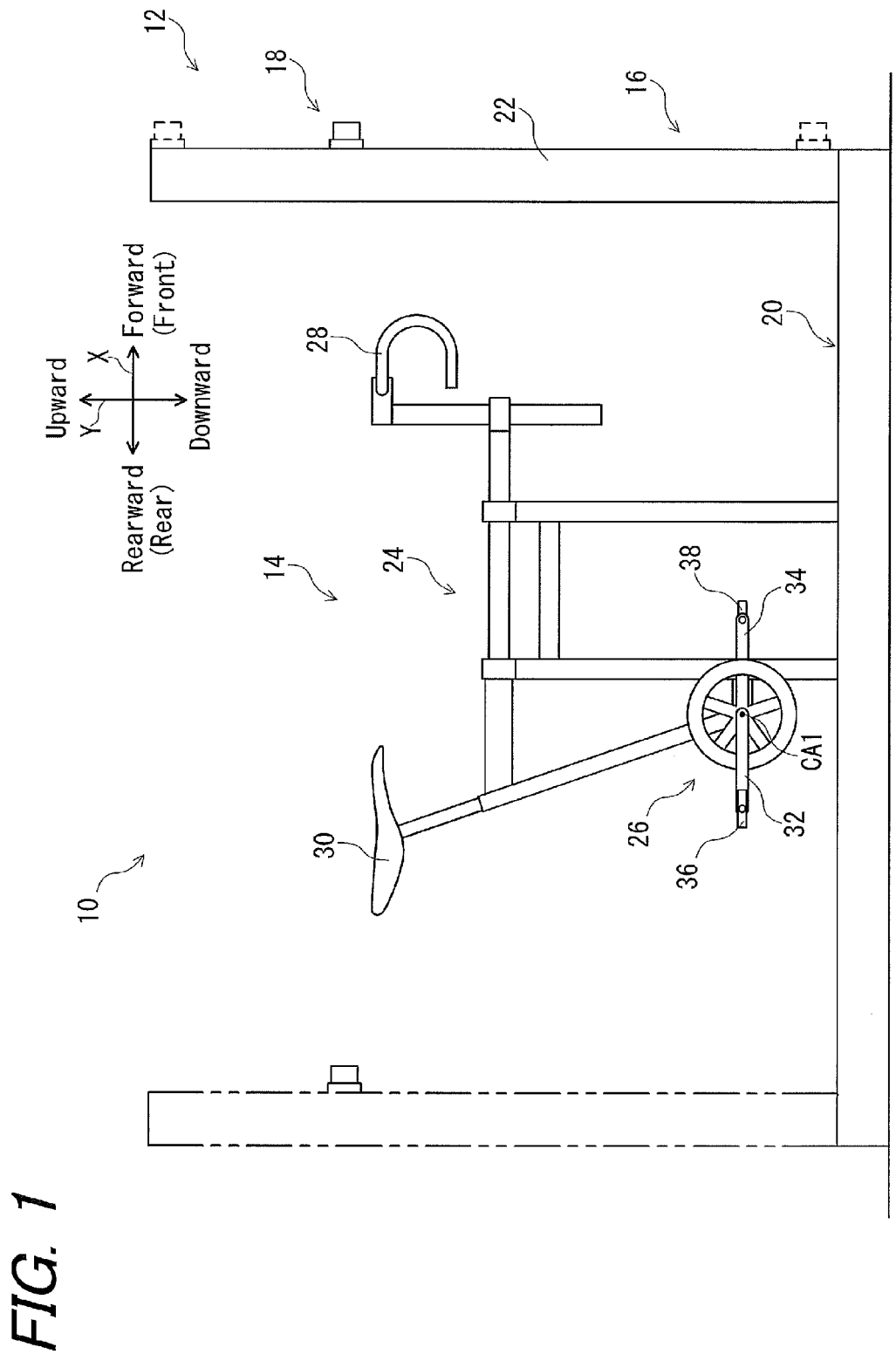
FIG. 1 is a side elevational view of a bicycle fitting system with a laser spotting device in accordance with a first embodiment of the present invention.

The embodiments will now be described with reference to the accompanying drawings, wherein like reference numerals designate corresponding or identical elements throughout the various drawings.

First Embodiment

Figure 2:
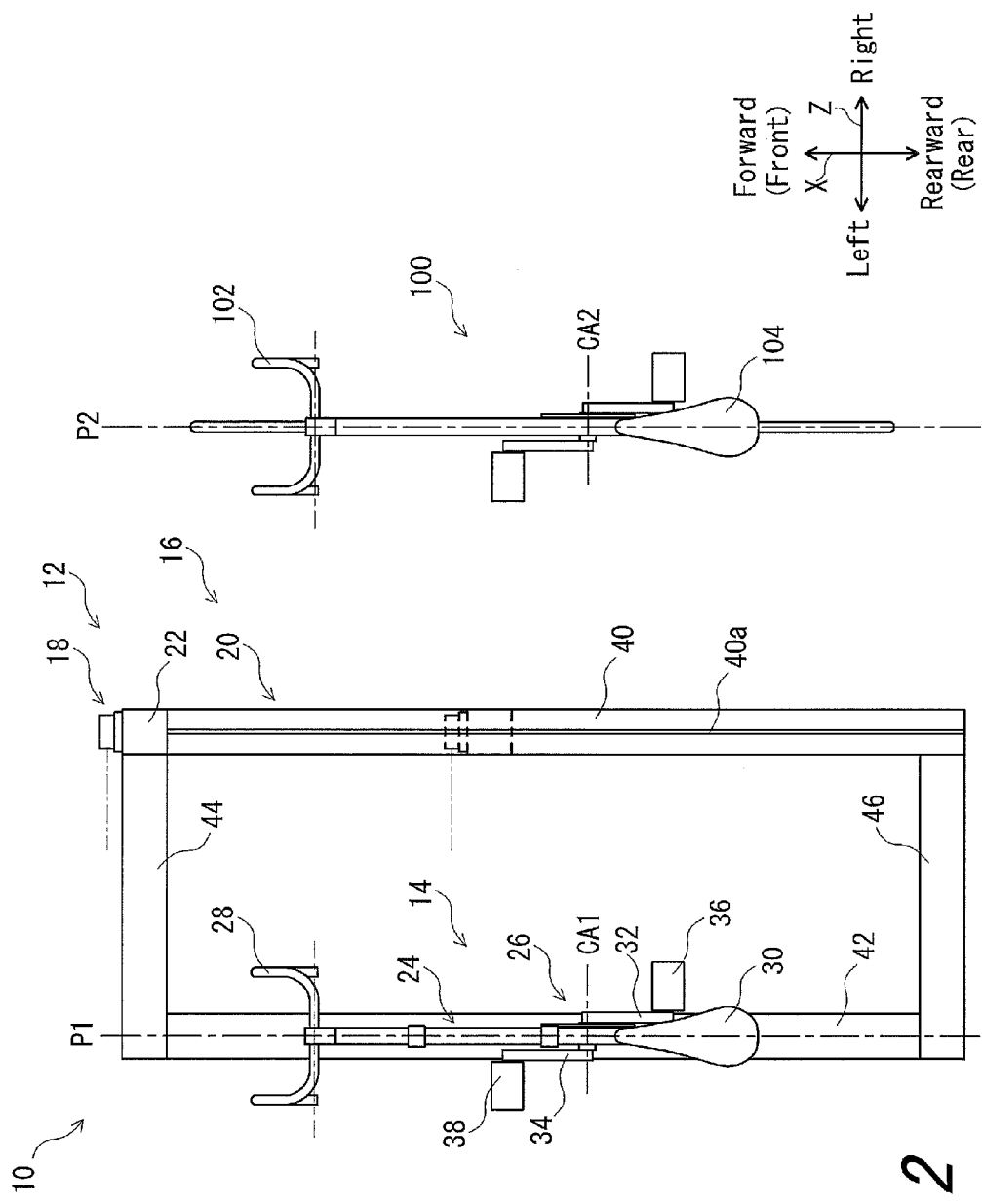
FIG. 2 is a top view of the bicycle fitting system illustrated in FIG. 1.

Referring initially to FIG. 1, a bicycle fitting system 10 provided for the bicycle fitting is illustrated. A two dimensional coordinate system is defined with respect to the bicycle fitting system 10. An X-direction is parallel to a horizontal direction of the bicycle fitting system. A Y-direction is parallel to a vertical direction of the bicycle fitting system 10. A Z-direction is perpendicular to the X- and Y-directions (FIG. 2).

As illustrated in FIG. 1, the bicycle fitting system 10 comprises a laser spotting device 12 and an adjustable stationary cycling machine 14. The laser spotting device 12 comprises a base member 16 and a laser emitting device 18 movably attached to the base member 16 in the X-direction and the Y-direction (one example of the first direction). The base member 16 includes a first part 20 and a second part 22.

The first part 20 is configured to be placed on a floor, for example. The second part 22 is movably attached to the first part 20 in the X-direction (one example of the second direction) which is perpendicular to the Y-direction. The second part 22 is movable relative to the first part 20 within the distance longer than maximum longitudinal length of the adjustable stationary cycling machine 14 in the X-direction.

The laser emitting device 18 is attached to the second part 22. More specifically, the laser emitting device 18 is movably attached to the second part 22 in the Y-direction. The second part 22 extends in the Y-direction to guide the laser emitting device 18 in the Y-direction. The laser emitting device 18 is movable relative to the second part 22 within the distance longer than maximum height of the adjustable stationary cycling machine 14 in the Y-direction. Accordingly, the laser emitting device 18 is movable relative to the first part 20 of the base member 16 in the X-direction and the Y-direction.

The adjustable stationary cycling machine 14 is connected to the base member 16 of the laser spotting device 12. More specifically, the adjustable stationary cycling machine 14 is placed on the first part 20 of the base member 16 and is secured to the first part 20. The adjustable stationary cycling machine 14 includes an adjustable frame 24, a crank assembly 26, a handlebar 28, and a saddle 30. The relative positions between the crank assembly 26, the handlebar 28, and the saddle 30 are adjustable using the adjustable frame 24.

The crank assembly 26 is attached to the adjustable frame 24 and includes a crank axle (not shown), a right crank arm 32, a left crank arm 34, a right pedal 36, and a left pedal 38. The crank axle is rotatably attached to a bottom bracket (not shown) of the adjustable frame 24 about a crank rotation axis CA1. The crank rotation axis CA1 can be defined as a reference point to measure the positions of the handlebar 28 and the saddle 30. The crank rotation axis CA1 is substantially perpendicular to the X-direction and the Y-direction. In other words, the crank rotational axis CA1 is substantially parallel to the Z-direction. The right crank arm 32 is secured to one end (right end) of the crank axle. The left crank arm 34 is secured to the other end (left end) of the crank axle. The right pedal 36 is rotatably attached to an end of the right crank arm 32. The left pedal 38 is rotatably attached to an end of the left crank arm 34. The handlebar 28 is attached to the adjustable frame 24. The saddle 30 is attached to the adjustable frame 24.

The adjustable frame 24 is configured to adjust positions of the handlebar 28 and the saddle 20 in X-direction and Y-direction relative to the crank rotational axis CA1. Since the adjustable frame 24 includes well known structures, they will not be discussed in detail herein to simplify the description.

In this embodiment, the following directional terms "forward", "rearward", "left", "right", "upward" and "downward" as well as any other similar directional terms refer to those directions which are determined on the basis of the rider who sits on the saddle 30 of the adjustable stationary cycling machine 14 with facing the handlebar 28, for example. Accordingly, these terms, as utilized to describe the adjustable stationary cycling machine 14 should be interpreted relative to the adjustable stationary cycling machine 14 as used in an upright riding position on a horizontal surface as illustrated in FIG. 1. The same definitions can be applied to the other embodiments. As illustrated in FIG. 1, the forward direction of the adjustable stationary cycling machine 14 corresponds to the positive (plus) direction of the X-direction. The rearward direction of the adjustable stationary cycling machine 14 corresponds to the negative (minus) direction of the X-direction. The upward direction of the adjustable stationary cycling machine 14 corresponds to the positive direction of the Y-direction. The downward direction of the adjustable stationary cycling machine 14 corresponds to the negative direction of the Y-direction.

Referring to FIG. 2, the first part 20 has a first frame 40, a second frame 42, a third frame 44, and a fourth frame 46. The first frame 40 extends in the X-direction. The second part 22 is movably provided on the first frame 40. The first frame 40 includes a guide rail 40a extending in the X-direction. The guide rail 40a is configured to guide the second part 22 in the X-direction. The second frame 42 extends in the X-direction. The second frame 42 is spaced apart from the first frame 40 in the Z-direction. The adjustable stationary cycling machine 14 is provided on the second frame 42. The third frame 44 extends in the Z-direction and couples one end (front end) of the first frame 40 to one end of the second frame 42. The fourth frame 46 extends in the Z-direction and couples the other end (rear end) of the first frame 40 to the other end of the second frame 42. The fourth frame 46 is spaced apart from the third frame 44 in the X-direction.

As illustrated in FIG. 2, the adjustable stationary cycling machine 14 is arranged at a first virtual plane P1 which is parallel to the Y-direction. More specifically, the first virtual plane P1 is parallel to the X-direction and the Y-direction and perpendicular to the Z-direction. Namely, the first virtual plane P1 is substantially perpendicular to the crank rotation axis CA1. The first virtual plane P1 is defined on the second frame 42 of the first part 20. As illustrated in FIG. 2, a second virtual plane P2 is defined on an opposite side of the first virtual plane P1 with respect to the first frame 40 of the first part 20. The second virtual plane P2 is parallel to the Y-direction and which differs from the first virtual plane P1. More specifically, the second virtual plane P2 is parallel to the X-direction and the Y-direction and perpendicular to the Z-direction. The second virtual plane P2 is parallel to the first virtual plane P1 and is defined to be spaced apart from the first virtual plane P1 in the Z-direction. An object bicycle 100 to be fitted using the bicycle fitting system 10 can be placed on an opposite side of the adjustable stationary cycling machine 14 with respect to the laser emitting device 18. The object bicycle 100 is placed at the second virtual plane P2, for example. The laser emitting device 18 is disposed between the first virtual plane P1 and the second virtual plane P2 in the Z-direction. The laser emitting device 18 is configured to emit laser beam toward the first virtual plane P1 and configured to emit laser beam toward the second virtual plane P2.

As illustrated in FIG. 3, the laser emitting device 18 includes a laser emitter 48 and a carrier 50. The laser emitter 48 has a laser output portion 52 configured to emit laser beam along a laser emitting axis LA.

The laser emitter 48 further includes a first display 54, a second display 56, a power switch 58, a reset button 60, and a laser button 62. The first display 54 is configured to display a X-coordinate of the laser emitting device 18. The X-coordinate of the laser emitting device 18 is a coordinate defined in the X-direction. The second display 56 is configured to display a Y-coordinate of the laser emitting device 18. The Y-coordinate of the laser emitting device 18 is a coordinate defined in the Y-direction. The power switch 58 is configured to be operated by the user to turn the laser emitting device 18 on or off. The reset button 60 is configured to be operated by the user to reset the X-coordinate of the first display 54 and the Y-coordinate of the second display 56. The laser button 62 is configured to be operated by the user to emit laser beam from the laser output portion 52. In the illustrated embodiment, the laser output portion 52 starts to emit laser beam when the laser button 62 is pressed, and the laser output portion 52 stops emitting laser beam when the laser button 62 is pressed again. It will be apparent to those skilled in the bicycle field that the laser emitting device 18 can have the configuration in which the laser output portion 52 keeps emitting laser beam only while the laser button 62 is pressed.

The carrier 50 is configured to movably attach the laser emitter 48 to the base member 16. In the illustrated embodiment, the carrier 50 is configured to movably attach the laser emitter 48 to the second part 22 of the base member 16 in the Y-direction. The carrier 50 is configured to change orientation of the laser output portion 52 relative to the carrier 50 such that the laser emitter 48 emits laser beam toward each of the first virtual plane P1 and the second virtual plane P2. More specifically, the laser emitter 48 is rotatably attached to the carrier 50 about a rotation axis AX, allowing the laser emitting axis LA of the laser output portion 52 to direct in different directions. The rotation axis AX is substantially parallel to the X-direction. It will be apparent to those skilled in the bicycle field that the carrier 50 can be provided integrally with the laser emitter 48 as a one-piece unitary member. In such embodiment, the laser emitter 48 is directly attached to the second part 22 to be movable in the Y-direction and to be rotatable about the rotation axis AX. In the illustrated embodiment, the carrier 50 is configured to change the orientation of the laser output portion 52 between a first orientation T1 as shown in FIG. 4 and a second orientation T2 as shown in FIG. 5.

Figure 4:
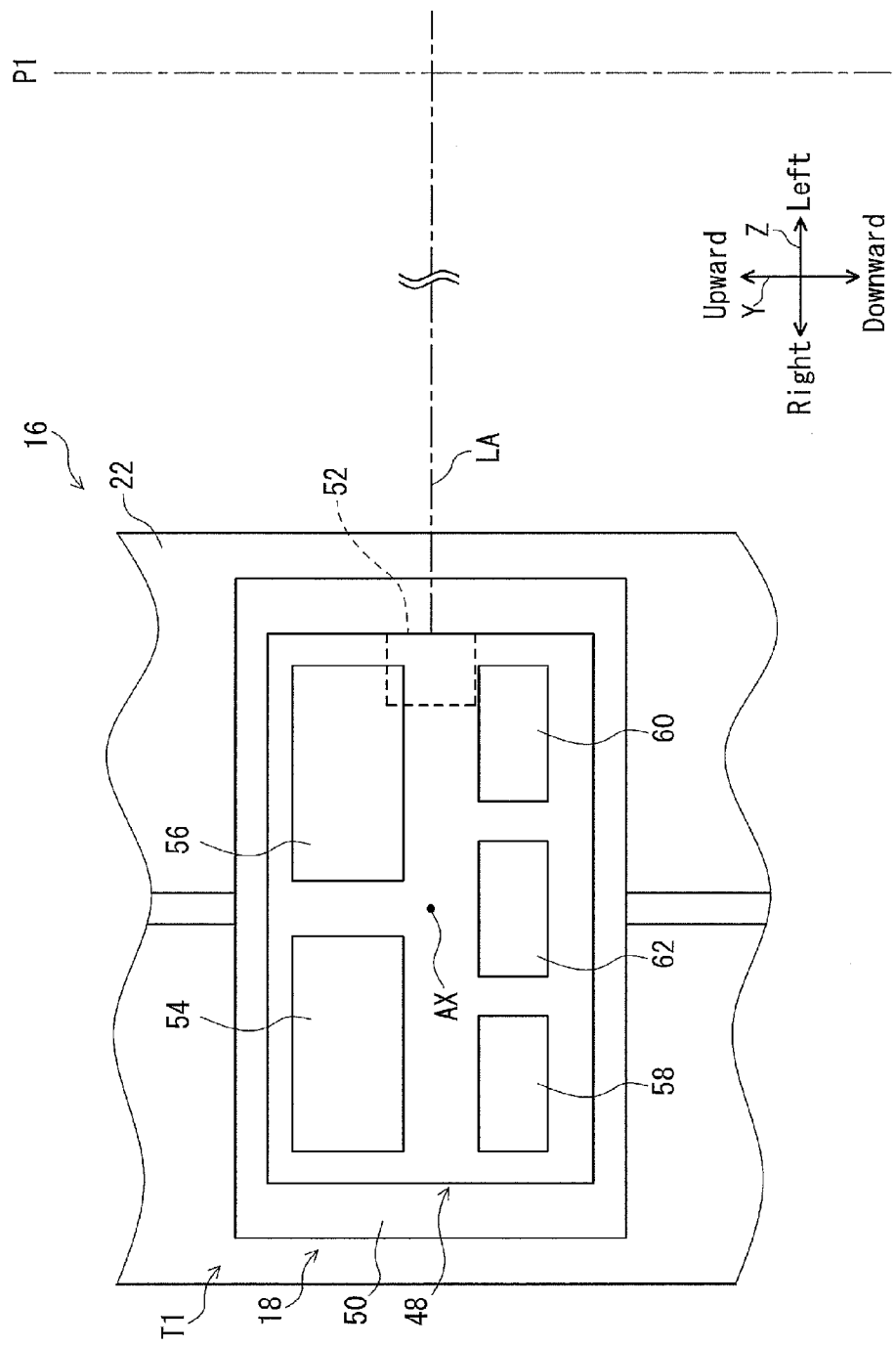
FIG. 4 is a partial side elevational view of the laser spotting device illustrated in FIG. 1 (first orientation)

At the first orientation T1 illustrated in FIG. 4, the laser output portion 52 is disposed on a side closer to the first virtual plane P1 with respect to the rotation axis AX. In this state, the laser emitting axis LA extends from the laser output portion 52 to a left direction of the Z-direction and toward the first virtual plane P1 in the Z-direction. Accordingly, the laser emitter 48 is disposed to emit laser beam toward the first virtual plane P1 at the first orientation T1.

Figure 5:
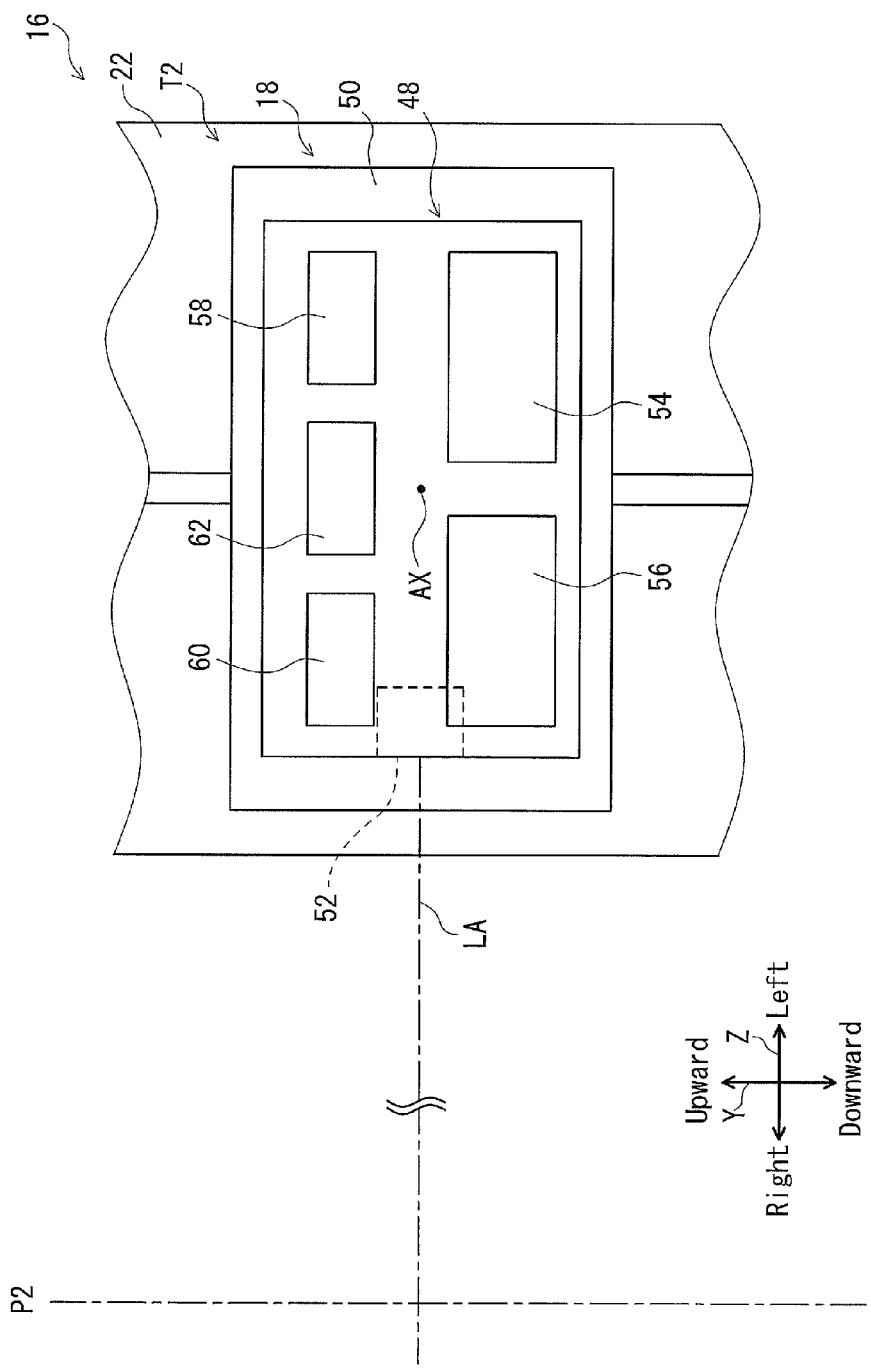
FIG. 5 is a partial side elevational view of the laser spotting device illustrated in FIG. 1 (second orientation)

At the second orientation T2 illustrated in FIG. 5, the laser emitter 48 is rotated 180 degrees about the rotation axis AX relative to the carrier 50 from the first orientation T1. Namely, the second orientation T2 is opposite to the first orientation T1. At the second orientation T2, the laser output portion 52 is disposed on a side closer to the second virtual plane P2 with respect to the rotation axis AX. The laser emitting axis LA extends from the laser output portion 52 to a right direction of the Z-direction and toward the second virtual plane P2 in the Z-direction. Accordingly, the laser emitter 48 is disposed to emit laser beam toward the second virtual plane P2 at the second orientation T2. The laser emitting device 18 has a structure such that the laser emitter 48 is positioned at each of the first orientation T1 and the second orientation T2. It will be apparent to those skilled in the bicycle field that the other orientations can be applied to the laser emitter 48 in accordance with the configuration of the bicycle fitting system 10.

Figure 6:
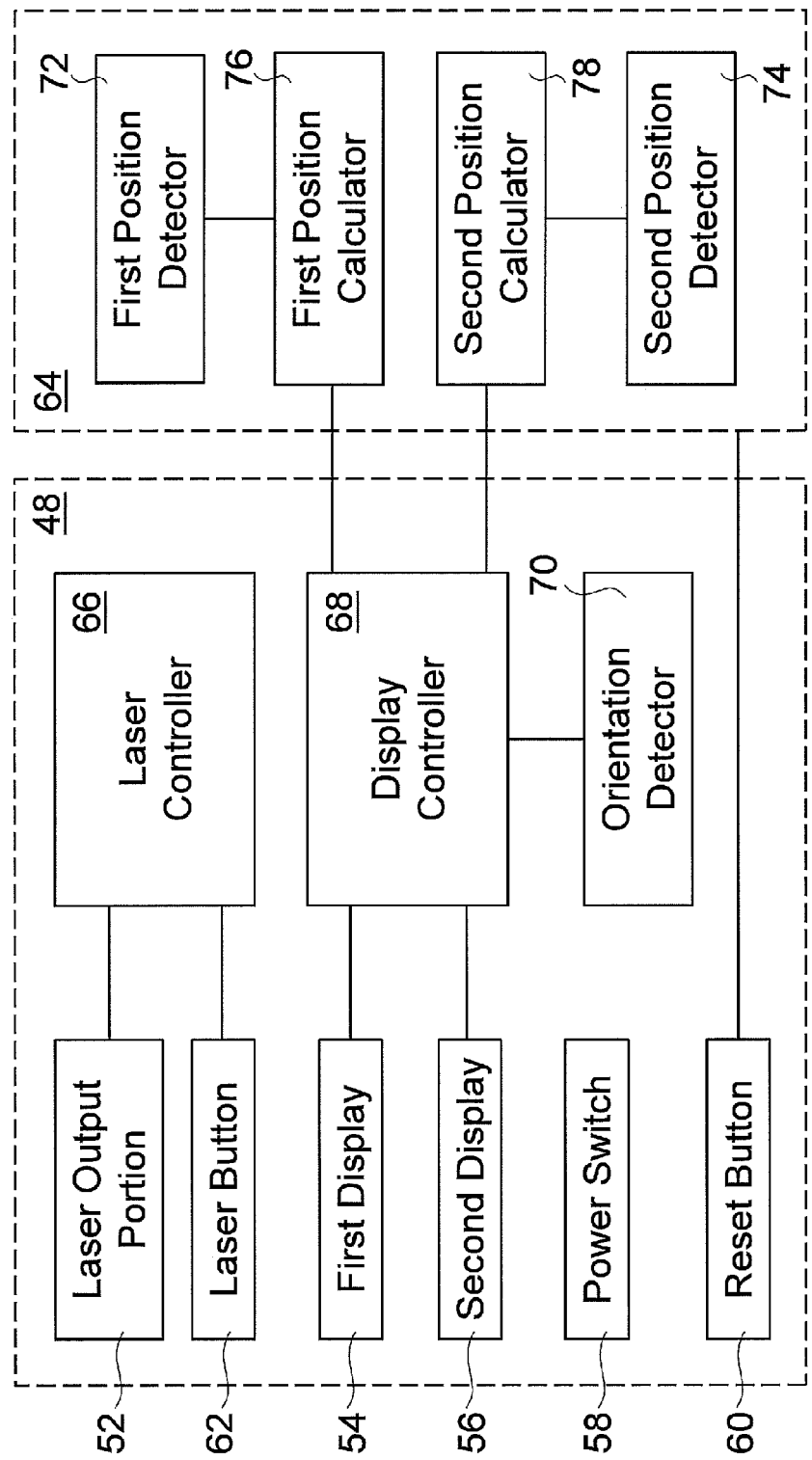
FIG. 6 is a block diagram of the laser spotting device illustrated in FIG. 1.

As illustrated in FIG. 6, the laser spotting device 12 further includes a detecting device 64, a laser controller 66, a display controller 68, and an orientation detector 70. The detecting device 64 is configured to detect coordinates of the laser emitting device 18 from initial coordinates of the laser emitting device 18. More specifically, the detecting device 64 includes a first position detector 72, a second position detector 74, a first position calculator 76, and a second position calculator 78.

The first position detector 72 includes a rotary encoder and is attached to the baser member 16. The first position detector 72 is configured to detect, as a rotational angle, a moving distance and a moving direction (e.g., the positive direction or the negative direction) of the laser emitting device 18 in the X-direction at a constant interval, for example. The first position calculator 76 is configured to calculate the X-coordinate of the current position of the laser emitting device 18 with respect to a predetermined reference position based on the rotational angle detected by the first position detector 72. The first position calculator 76 is configured to store the latest X-coordinate of the laser emitting device 18.

The second position detector 74 includes a rotary encoder and is attached to the baser member 16. The second position detector 74 is configured to detect, as a rotational angle, a moving distance and a moving direction (e.g., the positive direction or the negative direction) of the laser emitting device 18 in the Y-direction at a constant interval, for example. The second position calculator 78 is configured to calculate the Y-coordinate of the current position of the laser emitting device 18 with respect to the predetermined reference position based on the rotational angle detected by the second position detector 74. The second position calculator 78 is configured to store the latest Y-coordinate of the laser emitting device 18.

Returning to FIG. 6, the detecting device 64 is configured such that the initial coordinates are resettable. More specifically, the first position calculator 76 is further configured to reset the initial X-coordinate of the predetermined reference position based on the reset signal from the reset button 60. The second position calculator 78 is further configured to reset the initial Y-coordinate of the predetermined reference position based on the reset signal from the reset button 60. In the illustrated embodiment, when the reset button 60 is pressed by the user, the first position calculator 76 resets the stored latest X-coordinate to be zero and the second position calculator 78 resets the stored latest Y-coordinate to be zero. Accordingly, the position of the laser emitting device 18 at which the reset button 60 is pressed is set as a new reference position to detect the current position of the laser emitting device 18. After the reset button 60 was pressed, the first and second position calculators 76 and 78 start to calculate the X- and Y-coordinates of the current position of the laser emitting device 18 with respect to the new reference position, respectively.

The display controller 68 is configured to control the first display 54 to display the latest X-coordinate stored in the first position calculator 76. The display controller 68 is further configured to control the second display 56 to display the latest Y-coordinate stored in the second position calculator 78.

The orientation detector 70 is configured to detect the orientation of the laser emitter 48 relative to the carrier 50. The orientation detector 70 can include a rotary encoder or a photo sensor, for example. The orientation detector 70 is configured to detect the first orientation T1 and the second orientation T2 of the laser emitter 48. The display controller 68 is configured to change the orientation of the X-coordinate displayed on the first display 54 to rotate 180 degrees while the orientation detector 70 detects the second orientation T2. The display controller 68 is further configured to change the orientation of the Y-coordinate displayed on the second display 56 to rotate 180 degrees while the orientation detector 70 detects the second orientation T2. These prevent the first and second displays 54 and 56 from displaying the X- and Y-coordinates upside down.

The configurations of the laser emitting device 18 is not limited to the configuration illustrated in FIG. 6. For example, it will be apparent to those skilled in the bicycle field that the first position calculator 76 and the second position calculator 78 can be provided in the laser emitter 48 as well as the laser controller 66 and the display controller 68.

Figure 7:
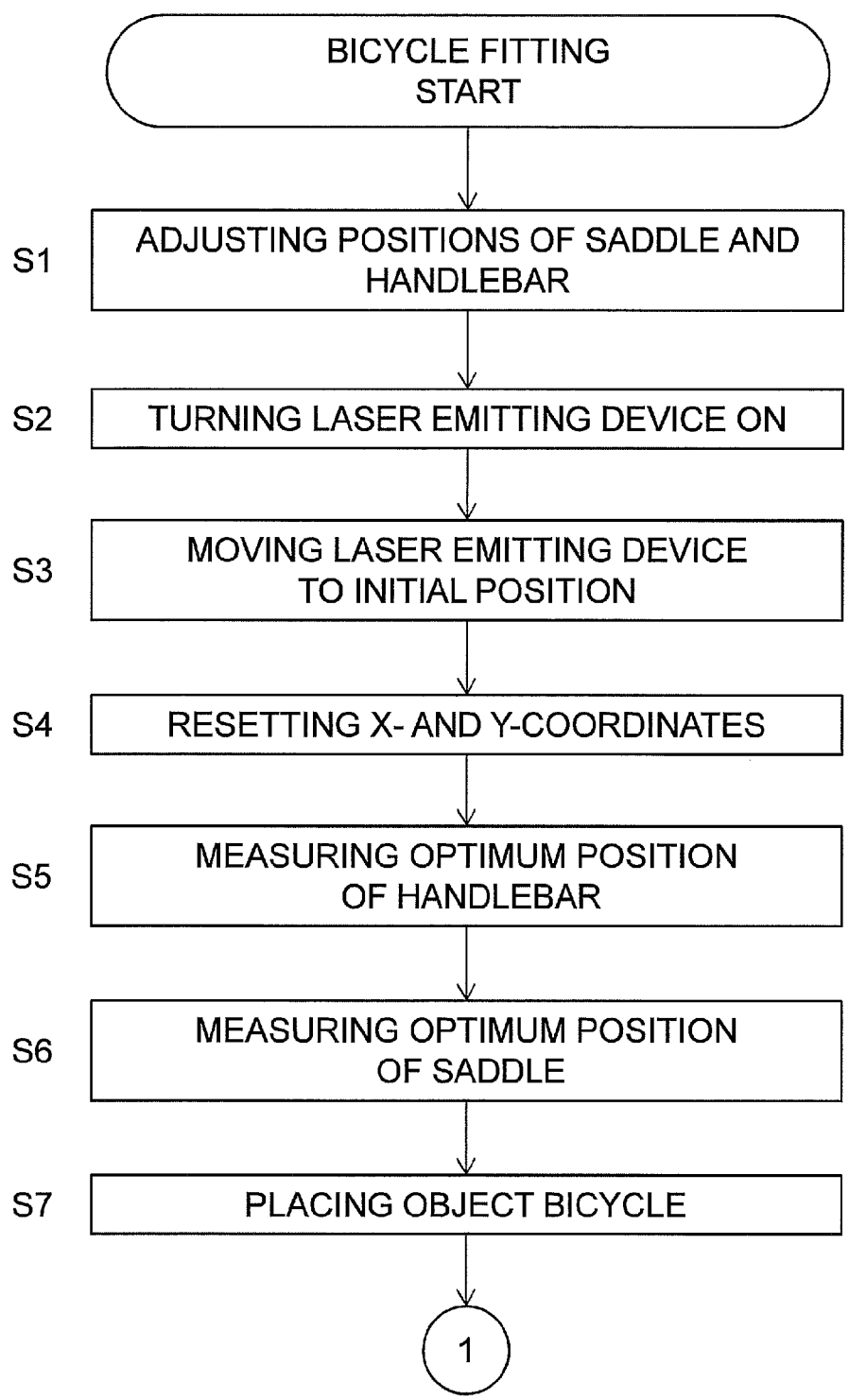
FIG. 7 is a flow chart of a method of bicycle fitting using the bicycle fitting system illustrated in FIG. 1.
Figure 8:
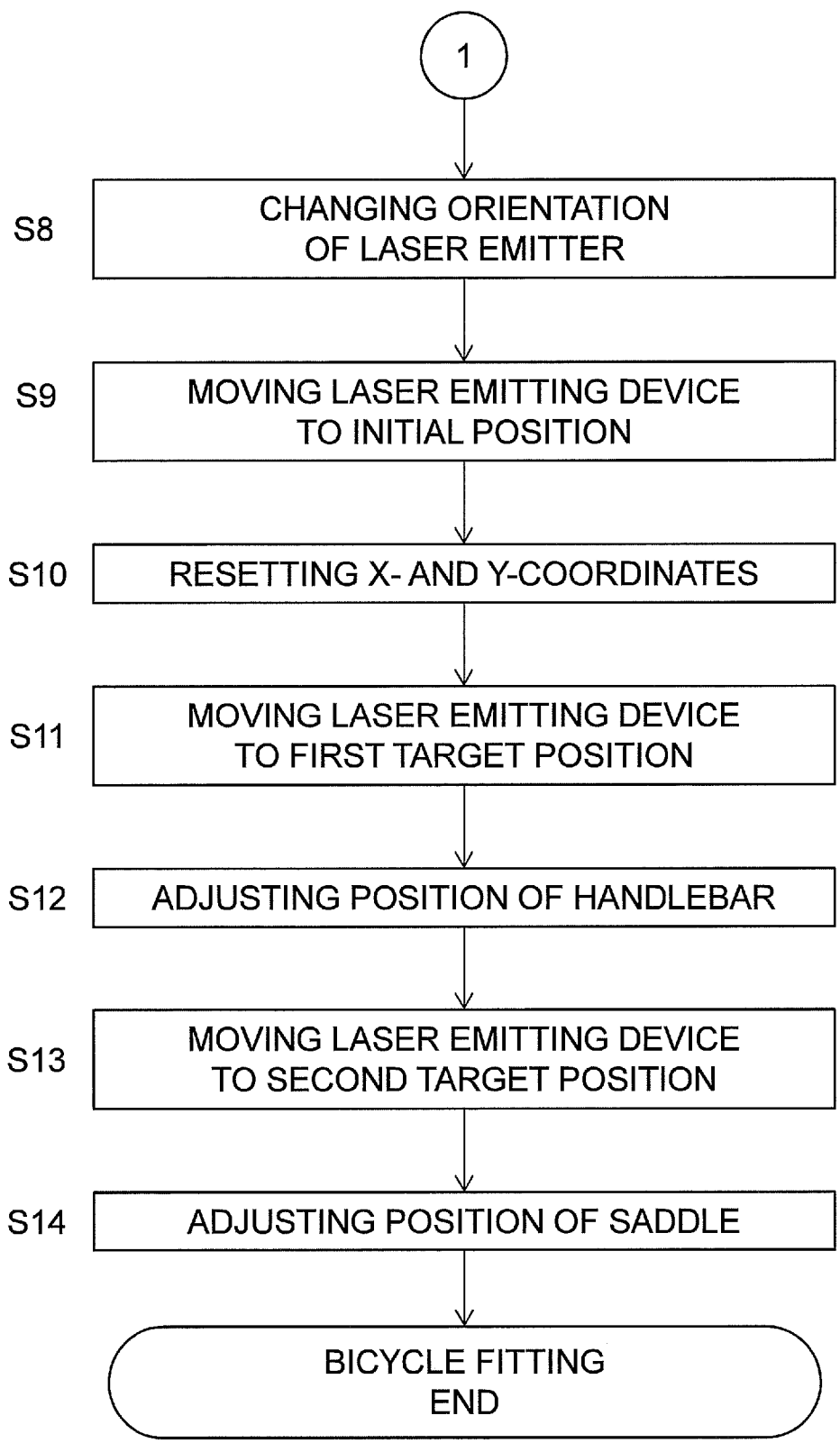
FIG. 8 is a flow chart of a method of the bicycle fitting using the bicycle fitting system illustrated in FIG. 1.

Referring to FIGS. 7 and 8, the method of fitting the bicycle to the user using the bicycle fitting system 10 will be described below.

In the step S1 of FIG. 7, the positions of the handlebar 28 and the saddle 30 are adjusted to be preferable for the user using the adjustable frame 24. For example, the user (the rider who owns the object bicycle 100 illustrated in FIG. 2) rides on the adjustable stationary cycling machine 14. The positions of the handlebar 28 and the saddle 30 are manually adjusted in accordance with the user's physical characteristics to find the preferable positions (or the best positions) of the handlebar 28 and the saddle 30. For example, it is possible to determine the preferable positions based on the measured output power when the user pedals the adjustable stationary cycling machine 14.

In the step S2, the power switch 58 is pressed to turn the laser emitting device 18 on. When the laser emitting device 18 is turned on, initial coordinates (i.e., zero) are stored in the first and second position calculators 76 and 78 as the initial X- and Y-coordinates of the laser emitting device 18, respectively. Furthermore, when the laser emitting device 18 is turned on, the initial X- and Y-coordinates stored in the first and second position calculators 76 and 78 are displayed on the first and second displays 54 and 56, respectively. After the initial X- and Y-coordinates of the reference position are set, the detecting device 64 starts to detect the X- and Y-coordinates of the current position of the laser emitting device 18.

In the step S3, the laser emitting device 18 is manually moved to the reference position relative to the adjustable stationary cycling machine 14. More specifically, the position of the laser emitting device 18 is adjusted to be a position corresponding to the crank rotation axis CA1. The second part 22 is manually moved relative to the first part 20 in the X-direction, and the laser emitting device 18 is manually moved relative to the second part 22 in the Y-direction. This allows the laser emitting device 18 to be moved to the desired position. When the laser button 62 is pressed by the user, laser beam is emitted from the laser output portion 52 of the laser emitting device 18. In the illustrated embodiment, the laser emitting device 18 starts to emit the laser beam when the laser button 62 is pressed, and keeps emitting the laser beam until the laser button 62 is pressed again. In a state where the laser emitting device 18 is located in the first orientation T1 relative to the carrier 50, the laser beam is emitted from the laser emitting device 18 toward the first virtual plane P1 (FIG. 2). The laser emitting device 18 is moved to a position at which the laser beam emitted from the laser emitting device 18 reaches the crank rotation axis CA1, for example.

In the step S4, the reset button 60 is pressed by the user in a state where the laser emitting device 18 is disposed at the position at which the laser beam emitted from the laser emitting device 18 reaches the crank rotation axis CA1. When the reset button 60 is pressed, the X- and Y-coordinates stored in the first and second position calculators 76 and 78 are set to be zero by the first and second position calculators 76 and 78, respectively. This causes the crank rotation axis CA1 to be set as the reference or initial position of the laser emitting device 18.

In the step S5, the preferable position of the handlebar 28 is measured using the laser emitting device 18. More specifically, the laser emitting device 18 is manually moved to a position at which the laser beam emitted from the laser emitting device 18 reaches a reference point of the handlebar 28 (e.g., a reference longitudinal axis of the handlebar 28). The X- and Y-coordinates of the current position of the laser emitting device 18 detected by the detecting device 64 are displayed on the first and second displays 54 and 56, respectively. The displayed X- and Y-coordinates indicate the positional relationship between the crank rotation axis CA1 and the current position of the laser emitting device 18. The displayed X- and Y-coordinates are recorded by the user as the preferable position of the handlebar 28.

In the step S6, the preferable position of the saddle 30 is measured using the laser emitting device 18. More specifically, the laser emitting device 18 is manually moved to a position at which the laser beam emitted from the laser emitting device 18 reaches a reference point of the saddle 30 (e.g., an uppermost surface of the saddle 30). The X- and Y-coordinates of the current position of the laser emitting device 18 detected by the detecting device 64 are displayed on the first and second displays 54 and 56, respectively. The displayed X- and Y-coordinates indicate the positional relationship between the crank rotation axis CA1 and the current position of the laser emitting device 18. The displayed X- and Y-coordinates are recorded by the user as the preferable position of the saddle 30.

In the step S7, the object bicycle 100 is placed in an opposite area of the adjustable stationary cycling machine 14 with respect to the laser emitting device 18 (FIG. 2). The object bicycle 100 is placed at the second virtual plane P2, for example. The object bicycle 100 is so located that a crank rotation axis CA2 of the object bicycle 100 is substantially parallel to the Z-direction as well as the adjustable stationary cycling machine 14.

In the step S8 of FIG. 8, the orientation of the laser emitter 48 is changed from the first orientation T1 (FIG. 4) to the second orientation T2 (FIG. 5). The laser emitter 48 is rotated relative to the carrier 50 about the rotation axis AX to change the orientation of the laser emitter 48 from the first orientation T1 to the second orientation T2. This allows the laser emitting device 18 to emit laser beam toward the object bicycle 100 placed in the opposite area.

In the step S9, the laser emitting device 18 is manually moved to the reference position relative to the object bicycle 100 by the user. More specifically, the position of the laser emitting device 18 is adjusted to be a position corresponding to the crank rotation axis CA2 of the object bicycle 100. Since the laser emitting device 18 is located at the second orientation T2 relative to the carrier 50, the laser beam is emitted from the laser emitting device 18 toward the object bicycle

100. The laser emitting device 18 is moved to a position at which the laser beam emitted from the laser emitting device 18 reaches the crank rotation axis CA2 of the object bicycle 100.

In the step S10, the reset button 60 is pressed by the user in a state where the laser emitting device 18 is disposed at the position at which the laser beam emitted from the laser emitting device 18 reaches the crank rotation axis CA2 of the object bicycle 100. When the reset button 60 is pressed, the latest X- and Y-coordinates stored in the first and second position calculators 76 and 78 are set to be zero by the first and second position calculators 76 and 78, respectively. This causes the crank rotation axis CA2 of the object bicycle 100 to be set as the reference or initial position of the laser emitting device 18.

In the step S11, the laser emitting device 18 is manually moved to a first target position corresponding to the preferable position which has been measured in the step S5. At the first target position, the X- and Y-coordinates displayed on the first and second displays 54 and 56 are the same as the X- and Y-coordinates of the preferable position of the handlebar 28.

In the step S12, a position of a handlebar 102 of the object bicycle 100 is adjusted to be a position at which the laser beam emitted from the laser emitting device 18 reaches a reference point of the handlebar 102 (e.g., a reference longitudinal axis of the handlebar 102). This allows the position of the handlebar 102 of the object bicycle 100 to be adjusted to a position corresponding to the preferable position of the handlebar 28.

In the step S13, the laser emitting device 18 is manually moved to a second target position corresponding to the preferable position which has been measured in the step S6. At the second target position, the X- and Y-coordinates displayed on the first and second displays 54 and 56 are the same as the X- and Y-coordinates of the preferable position of the saddle 30.

In the step S14, a position of a saddle 104 of the object bicycle 100 is adjusted to be a position at which the laser beam emitted from the laser emitting device 18 reaches a reference point of the saddle 104 (e.g., an uppermost surface of the saddle 104). This allows the position of the saddle 104 of the object bicycle 100 to be adjusted to a position corresponding to the preferable position of the saddle 30.

With the laser spotting device 12 of the first embodiment, since the laser emitting device 18 is configured to emit laser beam toward the first virtual plane P1 and to emit laser beam toward the second virtual plane P2, the preferable positions of the adjustable bicycle components can be easily measured and applied to the object bicycle 100. It will be apparent to those skilled in the bicycle field that the adjustable stationary cycling machine 14 can be replaced the usual bicycles. In such embodiment, the adjusted preferable positions of the adjustable bicycle components of one bicycle can be easily measured and applied to the other bicycle using the laser spotting device 12.

Second Embodiment

A bicycle fitting system 210 in accordance with the second embodiment will be described below referring to FIGS. 9 to 11. Elements having substantially the same function as those in the first embodiment will be numbered the same here, and will not be described again in detail.

Figure 9:
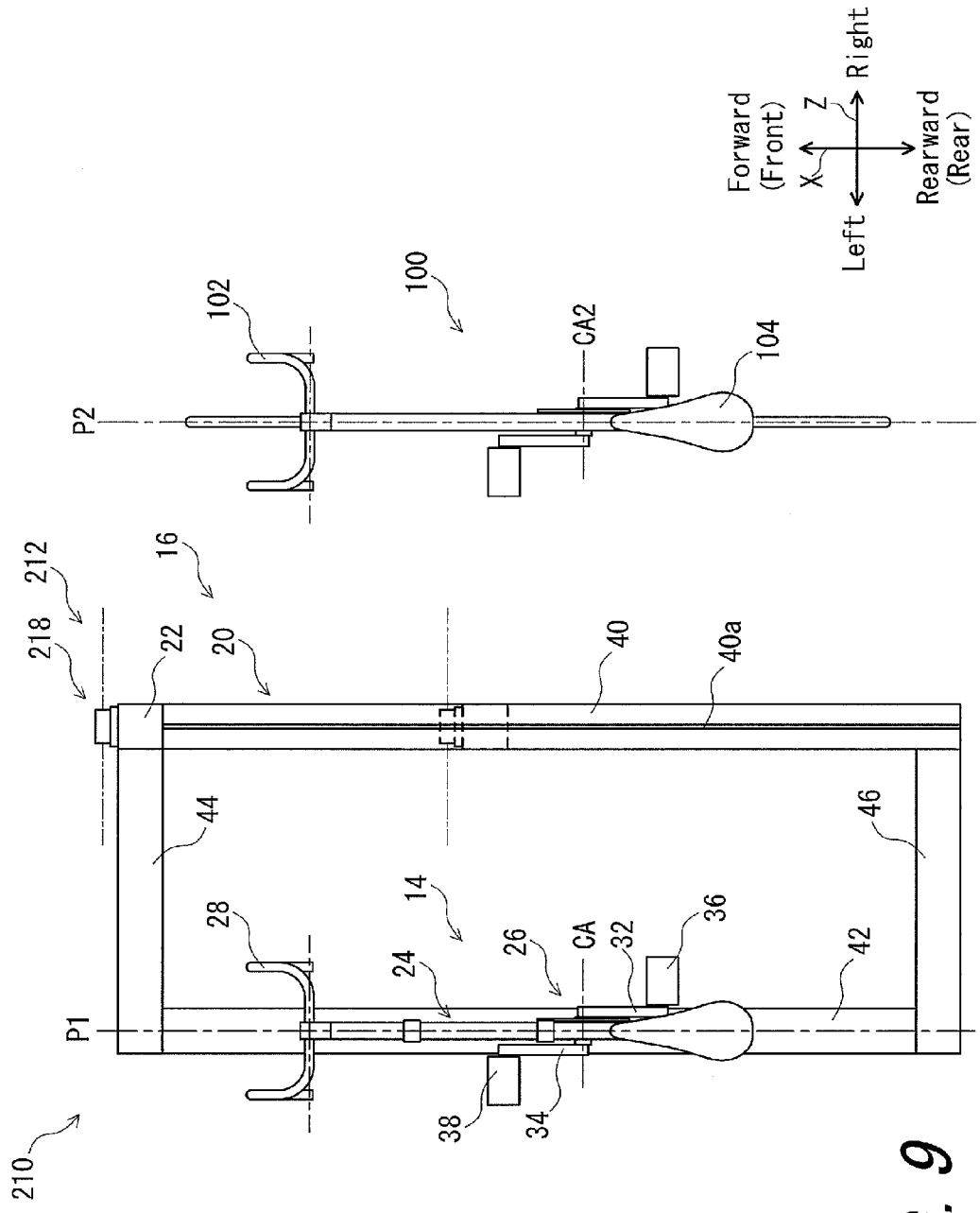
FIG. 9 is a top view of a bicycle fitting system with a laser spotting device in accordance with a second embodiment of the present invention.

Referring to FIG. 9, the bicycle fitting system 210 includes a laser spotting device 212 and the adjustable stationary cycling machine 14. The laser spotting device 212 includes the base member 16 and a laser emitting device 218.

Figure 10:
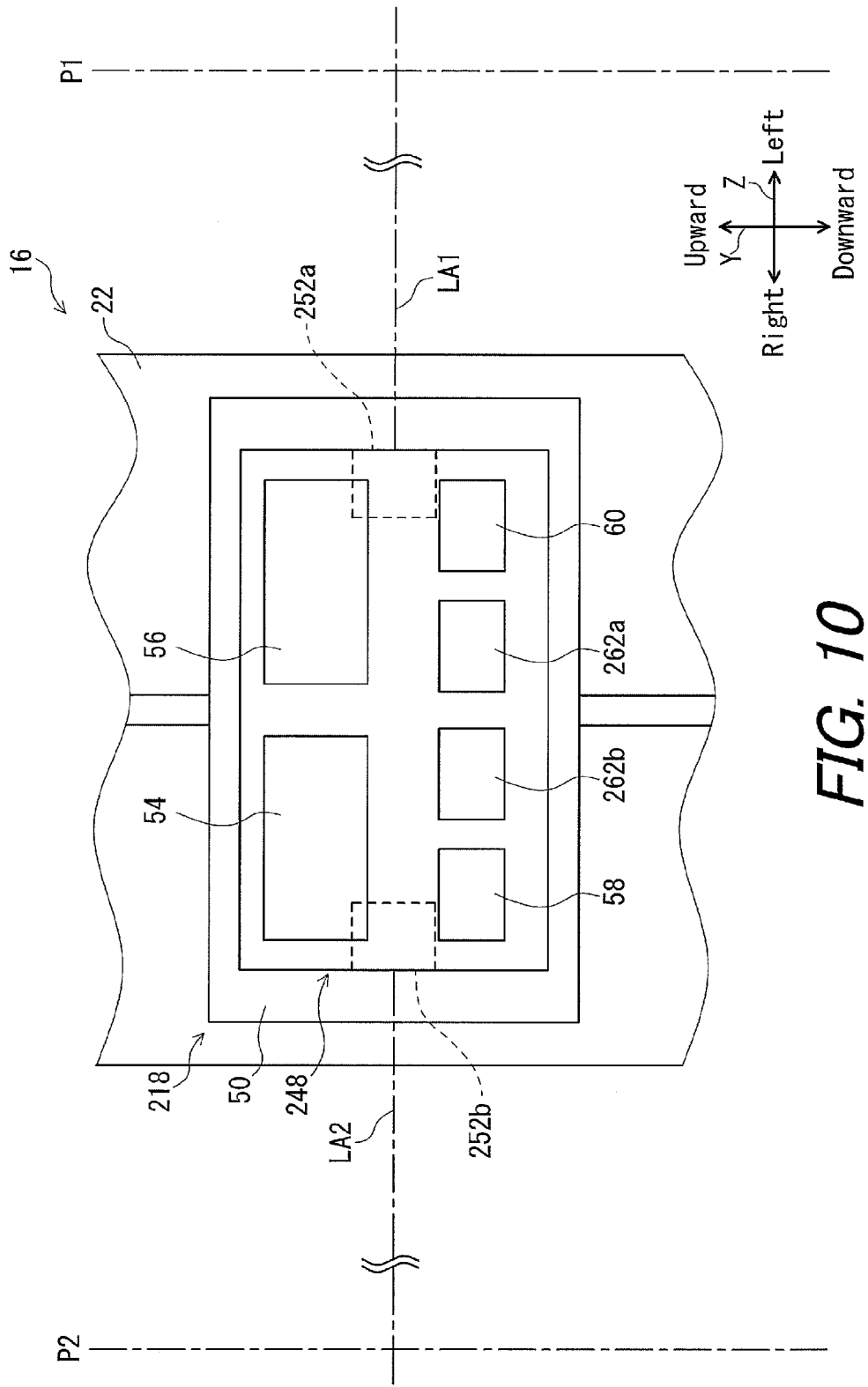
FIG. 10 is a partial side elevational view of the laser spotting device illustrated in FIG. 9.

As illustrated in FIG. 10, the laser emitting device 218 includes a laser emitter 248 and the carrier 50. Unlike the laser emitter 48 of the first embodiment, the laser emitter 248 is secured to the carrier 50 and is not rotatable about the rotation axis AX. The laser emitter 248 includes a first laser emitter 252a, a second laser emitter 252b, a first laser button 262a, and a second laser button 262b instead of the laser output portion 52 and the laser button 62 of the first embodiment. The orientation detector 70 is omitted from the laser emitting device 218 since the laser emitter 48 is secured to the carrier 50. It will be apparent to those skilled in the bicycle field that the carrier 50 can be provided integrally with the laser emitter 248 as a one-piece unitary member.

The second laser emitter 252b is configured to emit laser beam in a direction opposite to a direction in which the first laser emitter 252a emits laser beam. More specifically, the first laser emitter 252a is configured to emit laser beam toward the first virtual plane P1. The second laser emitter 252b is configured to emit laser beam toward the second virtual plane P2. The first laser emitter 252a is configured to emit laser beam along a laser emitting axis LA1. The second laser emitter 252b is configured to emit laser beam along a laser emitting axis LA2. In the illustrated embodiment, the first laser emitter 252a and the second laser emitter 252b are provided integrally with each other.

Figure 11:
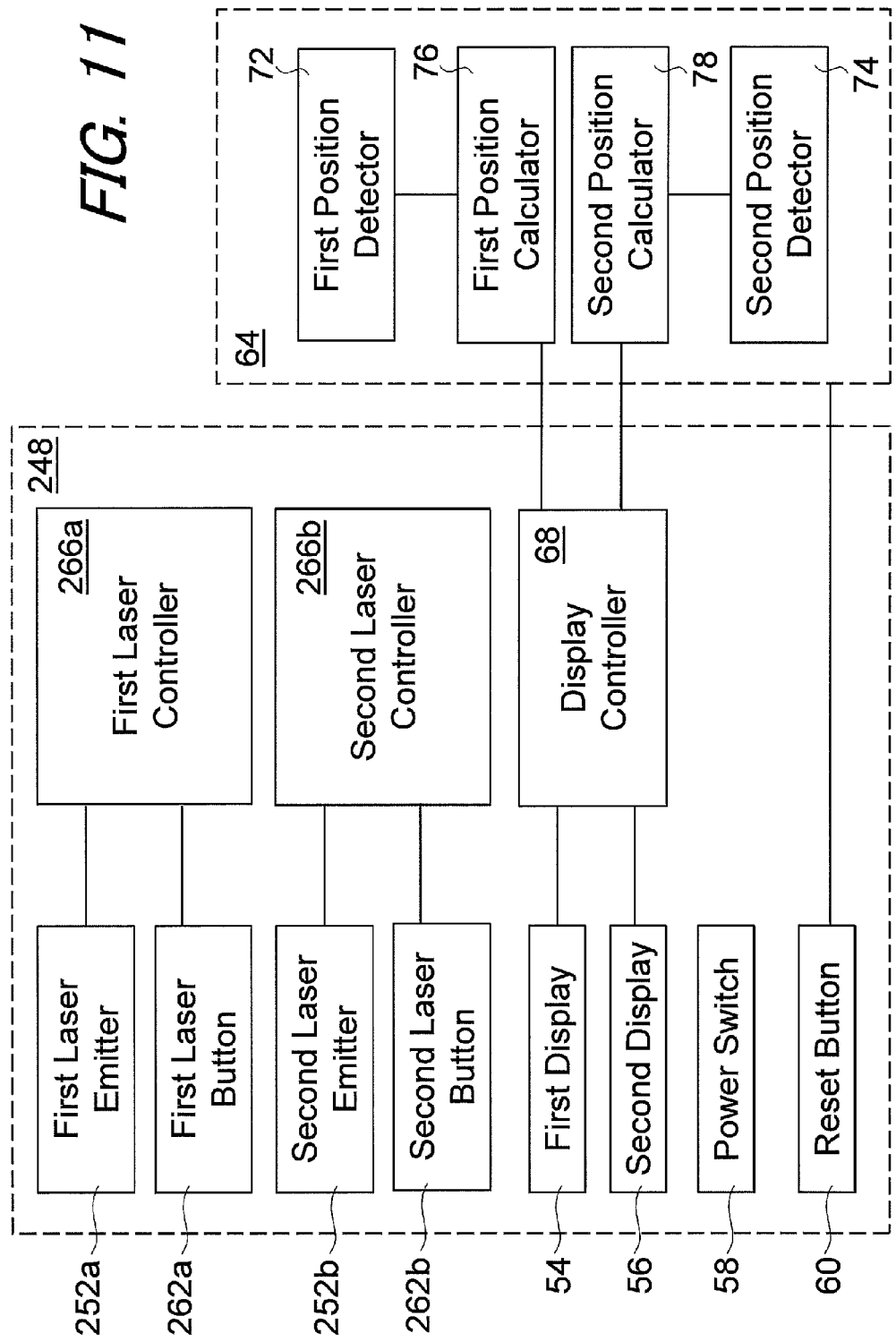
FIG. 11 is a block diagram of the laser spotting device illustrated in FIG. 9.

As illustrated in FIG. 11, the laser emitting device 218 further includes a first laser controller 266a and a second laser controller 266b. The first laser controller 266a is configured to control the first laser emitter 252a based on the signal from the first laser button 262a. The second laser controller 266b is configured to control the second laser emitter 252b based on the signal from the second laser button 262b. The first laser emitter 252a starts to emit laser beam toward the first virtual plane P1 when the first laser button 262a is pressed by the user. The first laser emitter 252a keeps emitting laser beam until the first laser button 262a is pressed again. The second laser emitter 252b starts to emit laser beam toward the second virtual plane P2 when the second laser button 262b is pressed by the user. The second laser emitter 252b keeps emitting laser beam until the second laser button 262b is pressed again. It will be apparent to those skilled in the bicycle field that the laser emitting device 218 can have the configuration in which the first and second laser emitters 252a and 252b keep emitting laser beam only while the first and second laser buttons 262a and 262b is pressed.

With the laser spotting device 212 of the second embodiment, since the laser emitting device 218 includes the first laser emitter 252a and the second laser emitter 252b, the preferable positions of the adjustable bicycle components can be easily measured and applied to the object bicycle 100 as well as the laser spotting device 12 of the first embodiment. It will be apparent to those skilled in the bicycle field that the adjustable stationary cycling machine 14 can be replaced the usual bicycles. In such embodiment, the adjusted preferable positions of the adjustable bicycle components of one bicycle can be easily measured and applied to the other bicycle using the laser spotting device 212.

Third Embodiment

A bicycle fitting system 310 in accordance with the third embodiment will be described below referring to FIGS. 12 to 15. Elements having substantially the same function as those in the above embodiments will be numbered the same here, and will not be described again in detail.

Figure 12:
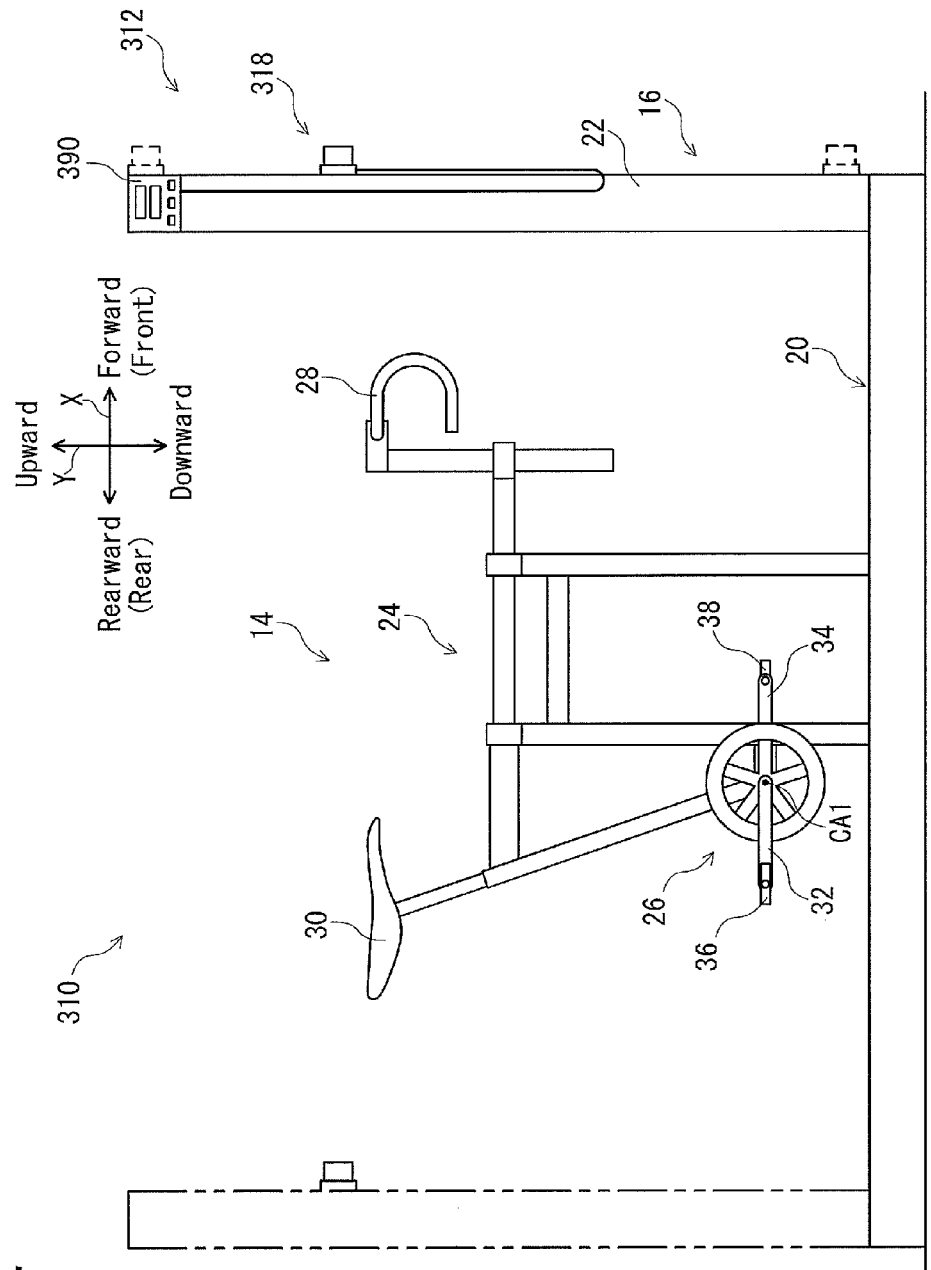
FIG. 12 is a side elevational view of a bicycle fitting system with a laser spotting device in accordance with a third embodiment of the present invention.

Referring to FIG. 12, the bicycle fitting system 310 includes a laser spotting device 312 and the adjustable stationary cycling machine 14. The laser spotting device 312 includes the base member 16, a laser emitting device 318, and a control device 390. The control device 390 is secured to an upper end of the second part 22 of the base member 16. The control device 390 is electrically connected to the laser emitting device 318.

Figure 13:
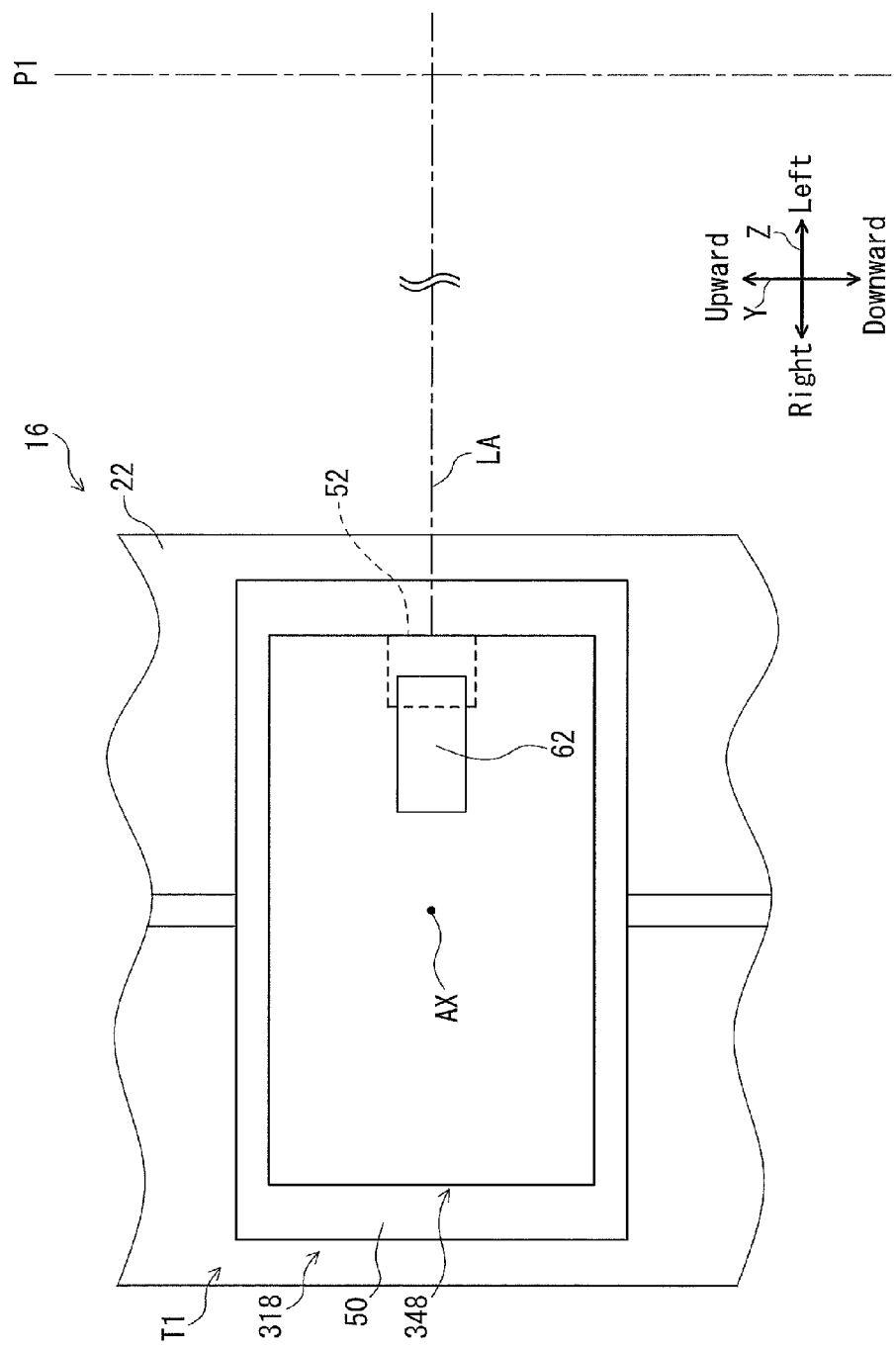
FIG. 13 is a partial side elevational view of the laser spotting device illustrated in FIG. 12 (first orientation)

As illustrated in FIG. 13, the laser emitting device 318 includes a laser emitter 348 and the carrier 50. The laser emitter 348 is rotatably attached to the carrier 50 about the rotation axis AX as well as the laser emitter 48 of the first embodiment. The laser emitter 348 includes the laser output portion 52 and the laser button 62. Unlike the laser emitter 48 of the first embodiment, the first display 54, the second display 56, the power switch 58, the reset button 60, and the display controller 68 are provided in the control device 390.

Figure 14:
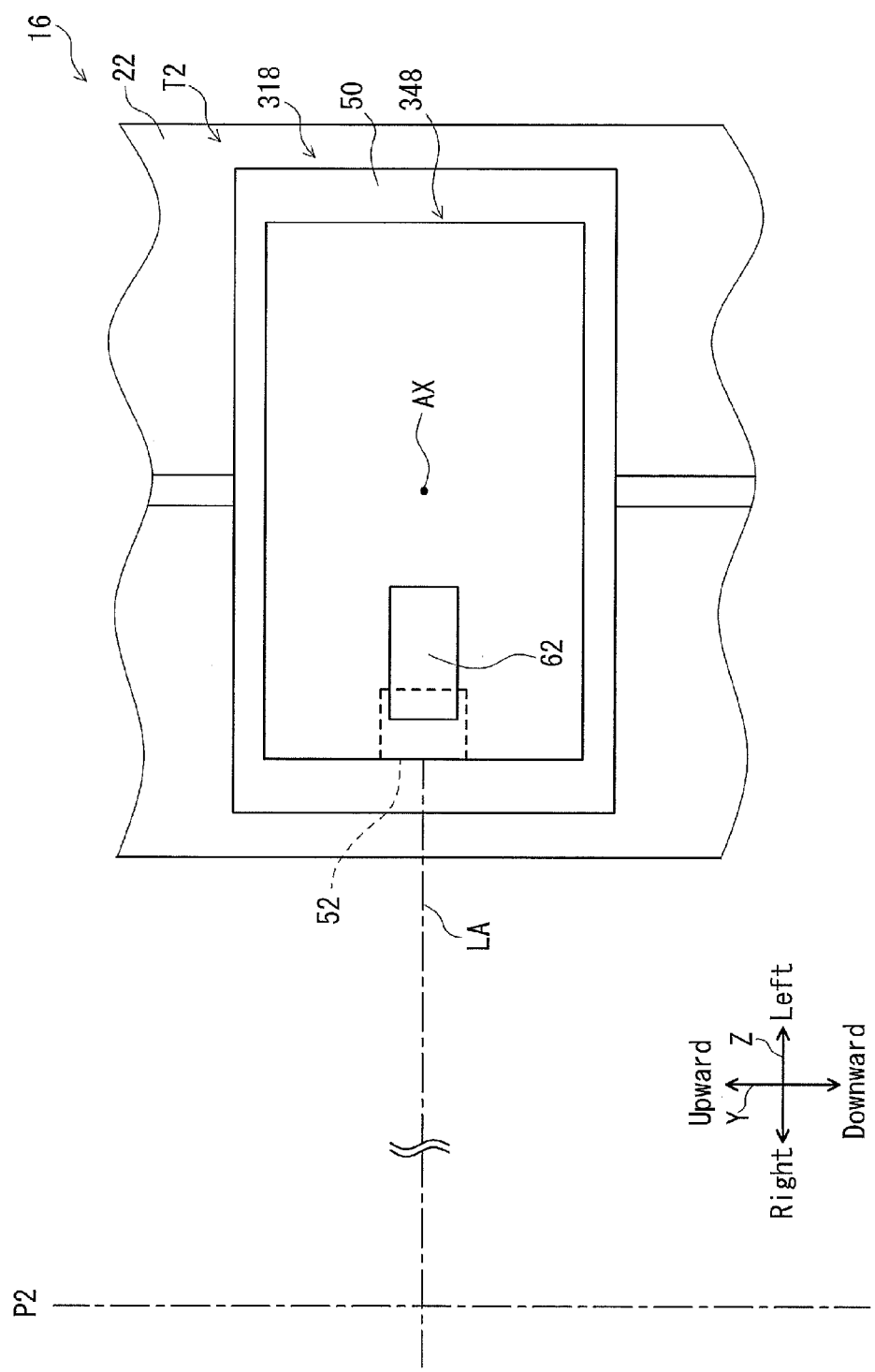
FIG. 14 is a partial side elevational view of the laser spotting device illustrated in FIG. 12 (second orientation)

As illustrated in the FIG. 13, the laser output portion 52 is configured to emit laser beam toward the first virtual plane P1 at the first orientation T1. As illustrated in FIG. 14, the laser output portion 52 is configured to emit laser beam toward the second virtual plane P2 at the second orientation T2.

Figure 15:
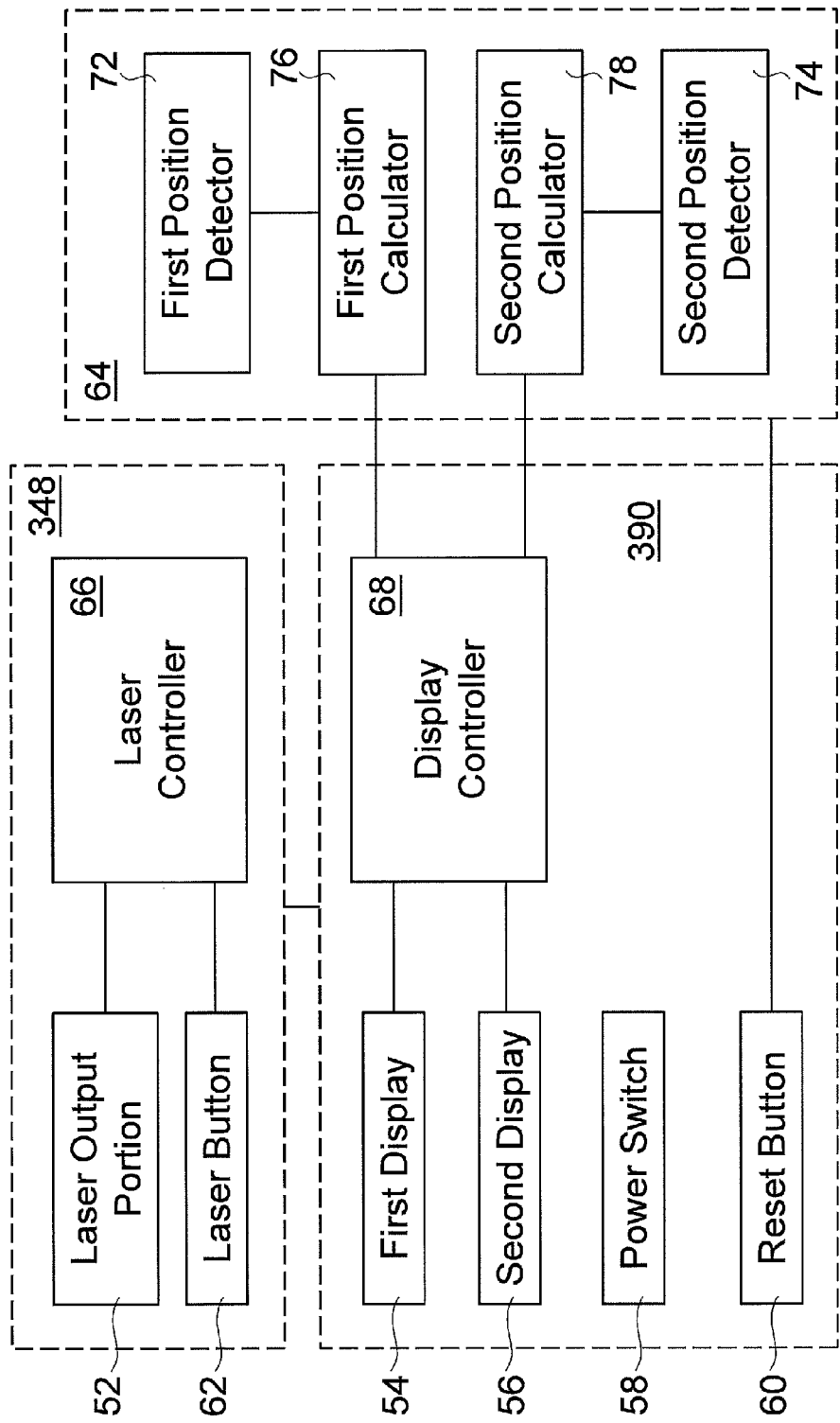
FIG. 15 is a block diagram of the laser spotting device illustrated in FIG. 12.

Referring to FIG. 15, the laser emitter 348 further includes the laser controller 66 configured to control the laser output portion 52 based on the signal from the laser button 62. The control device 390 includes the first display 54, the second display 56, the power switch 58, the reset button 60, and the display controller 68. The orientation detector 70 can be omitted since the first and second displays 54 and 56 are provided in the control device 390 secured to the second part 22.

With the laser spotting device 312 of the third embodiment, since the laser emitting device 318 is configured to emit laser beam toward the first virtual plane P1 and to emit laser beam toward the second virtual plane P2, the preferable positions of the adjustable bicycle components can be easily measured and applied to the object bicycle 100. It will be apparent to those skilled in the bicycle field that the adjustable stationary cycling machine 14 can be replaced the usual bicycles. In such embodiment, the adjusted preferable positions of the adjustable bicycle components of one bicycle can be easily measured and applied to the other bicycle using the laser spotting device 312.

Fourth Embodiment

A bicycle fitting system 410 in accordance with the fourth embodiment will be described below referring to FIGS. 16 to 18. Elements having substantially the same function as those in the above embodiments will be numbered the same here, and will not be described again in detail.

Figure 16:
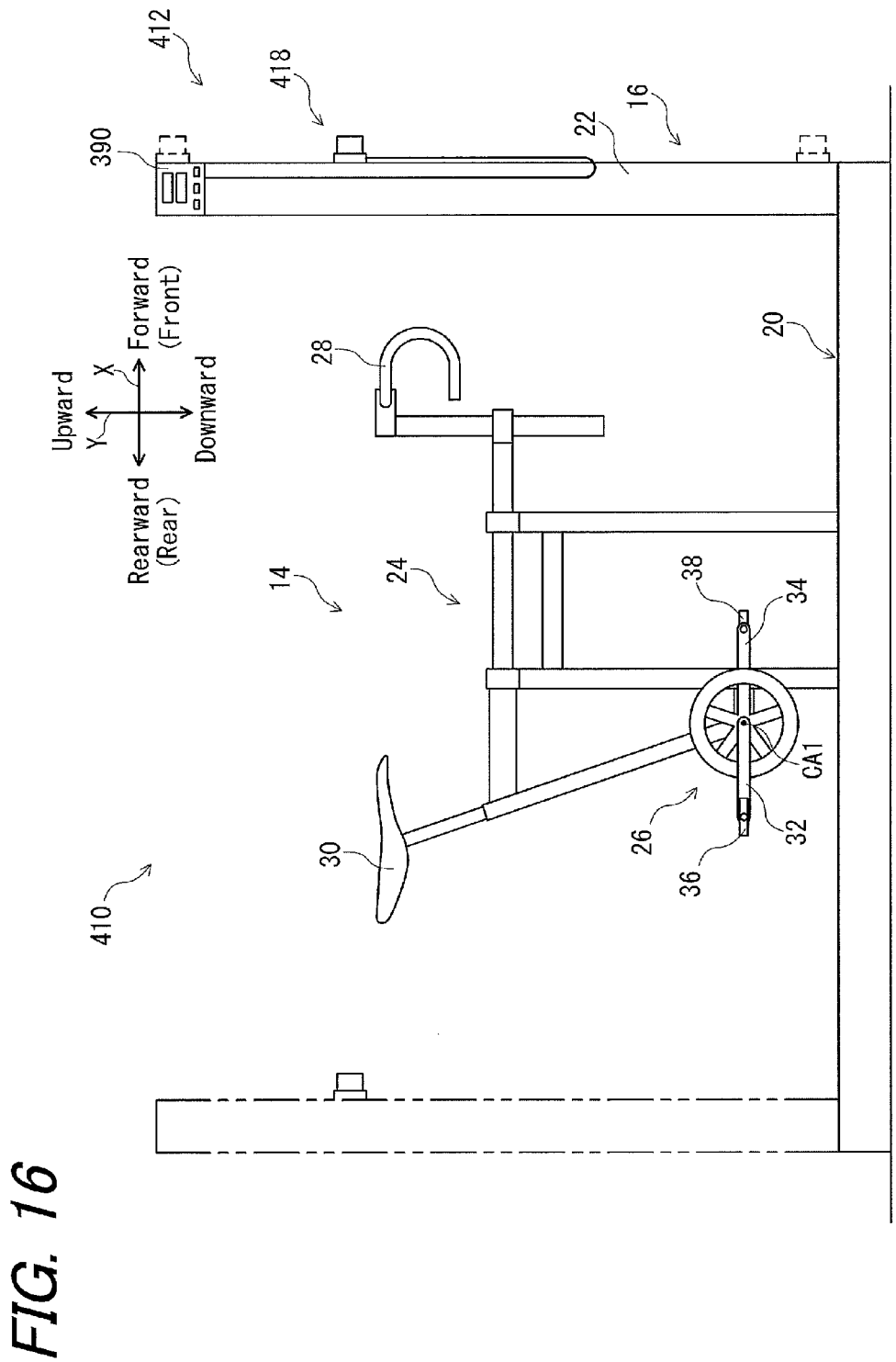
FIG. 16 is a side elevational view of a bicycle fitting system with a laser spotting device in accordance with a fourth embodiment of the present invention.

Referring to FIG. 16, the bicycle fitting system 410 includes a laser spotting device 412 and the adjustable stationary cycling machine 14. The laser spotting device 412 includes the base member 16, a laser emitting device 418, and a control device 390. The control device 390 is secured to an upper end of the second part 22 of the base member 16. The control device 390 is electrically connected to the laser emitting device 418.

Figure 17:
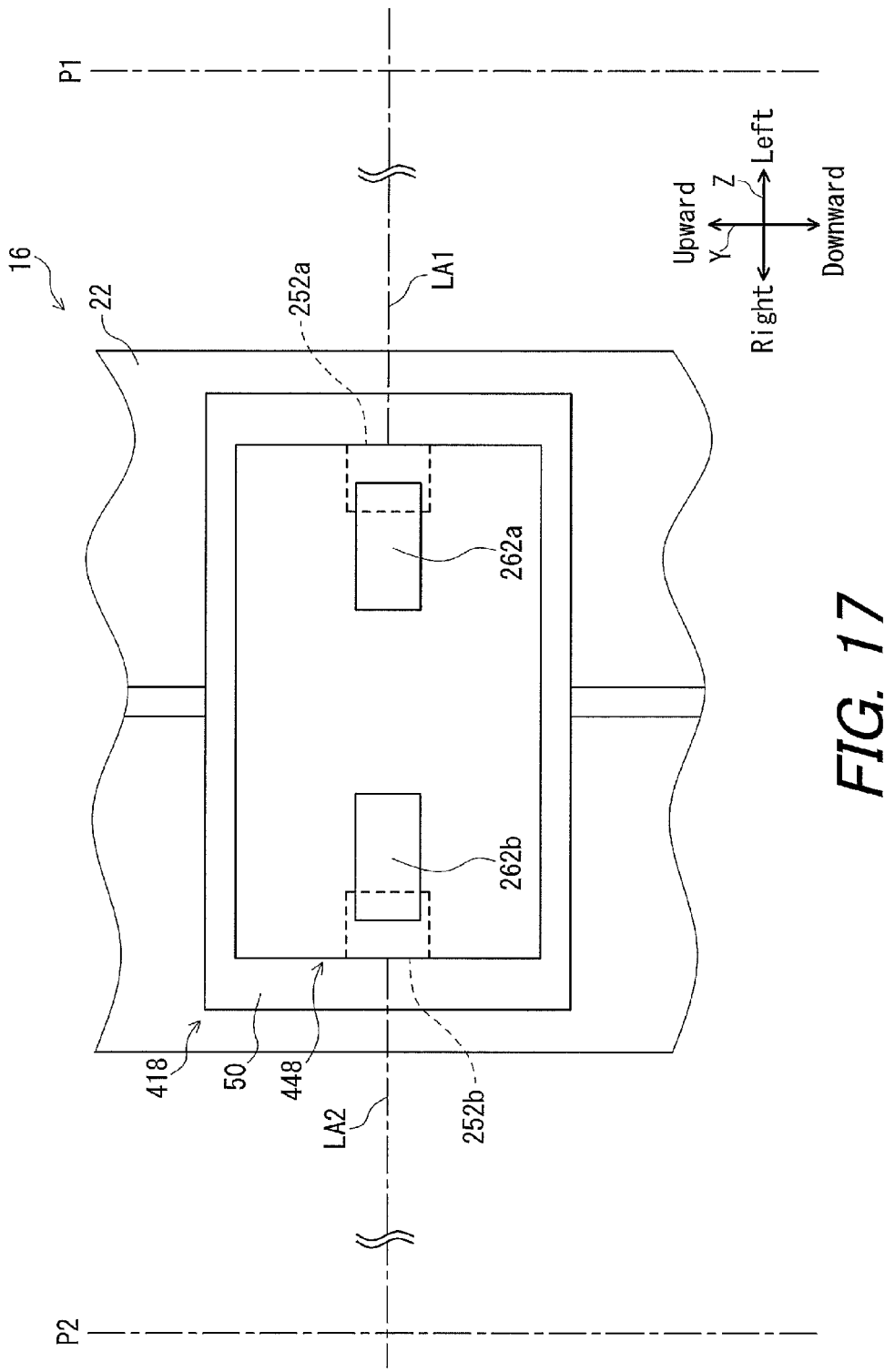
FIG. 17 is a partial side elevational view of the laser spotting device illustrated in FIG. 16.

As illustrated in FIG. 17, the laser emitting device 418 includes a laser emitter 448 and the carrier 50. The laser emitter 448 is secured to the carrier 50 and is not rotatable relative to the carrier about the rotation axis AX. The laser emitter 448 includes the first laser emitter 252a, the second laser emitter 252b, the first laser button 262a, and the second laser button 262b as well as the laser emitting device 218 of the second embodiment. Unlike the laser emitter 248 of the second embodiment, the first display 54, the second display 56, the power switch 58, the reset button 60, and the display controller 68 are provided in the control device 390.

As illustrated in FIG. 17, the first laser emitter 252a is configured to emit laser beam toward the first virtual plane P1. The second laser emitter 252b is configured to emit laser beam toward the second virtual plane P2.

Figure 18:
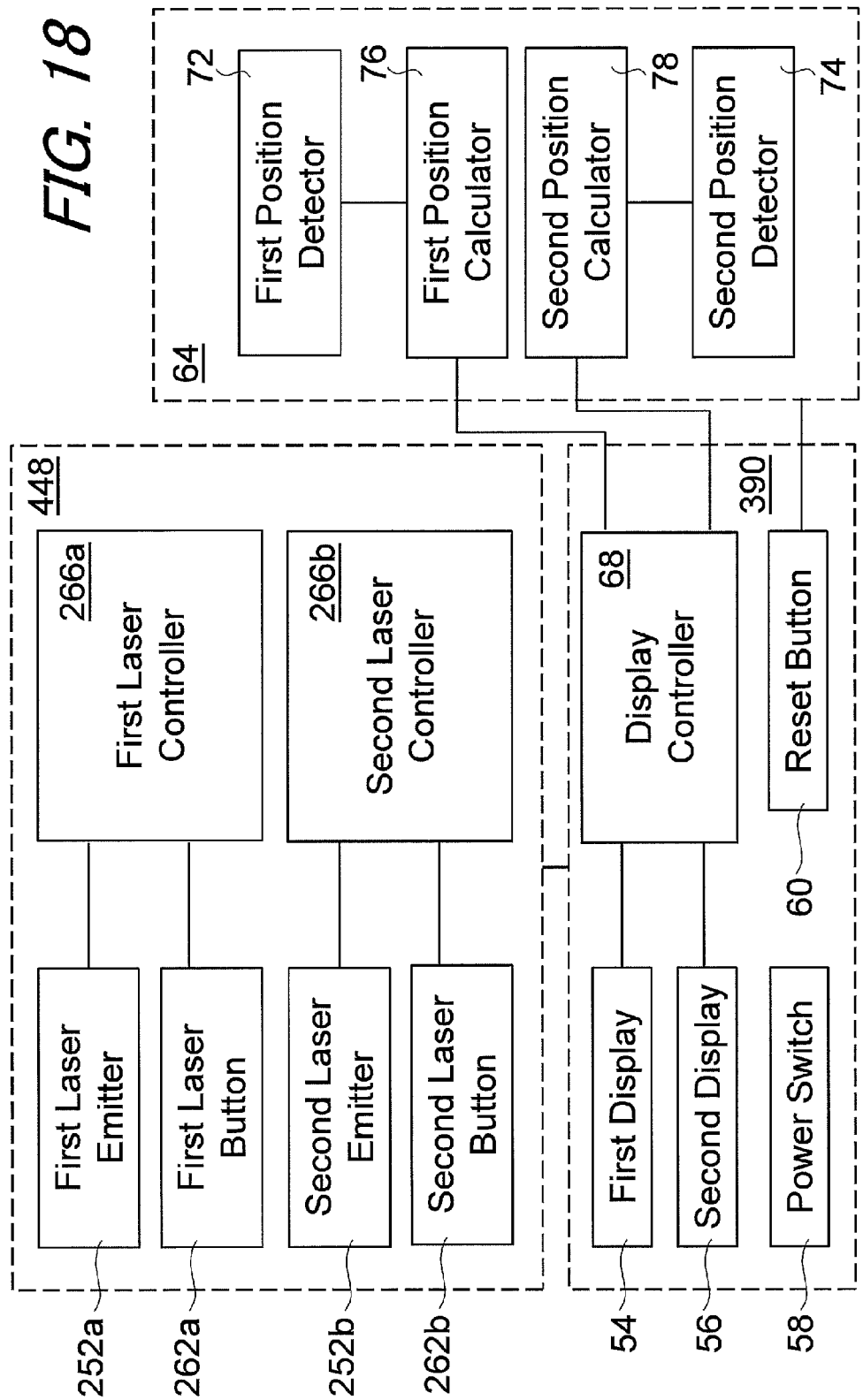
FIG. 18 is a block diagram of the laser spotting device illustrated in FIG. 16.

As illustrated in FIG. 18, the laser emitter 448 further includes the first laser controller 266a and the second laser controller 266b. The control device 390 includes the first display 54, the second display 56, the power switch 58, the reset button 60, and the display controller 68. The orientation detector 70 can be omitted since the first and second displays 54 and 56 are provided in the control device 390 secured to the second part 22.

With the laser spotting device 412 of the fourth embodiment, since the laser emitting device 418 is configured to emit laser beam toward the first virtual plane P1 and to emit laser beam toward the second virtual plane P2, the preferable positions of the adjustable bicycle components can be easily measured and applied to the object bicycle 100. It will be apparent to those skilled in the bicycle field that the adjustable stationary cycling machine 14 can be replaced the usual bicycles. In such embodiment, the adjusted preferable positions of the adjustable bicycle components of one bicycle can be easily measured and applied to the other bicycle using the laser spotting device 412.

Fifth Embodiment

A bicycle fitting system 510 in accordance with the fifth embodiment will be described below referring to FIG. 19. Elements having substantially the same function as those in the above embodiments will be numbered the same here, and will not be described again in detail.

Referring to FIG. 19, the bicycle fitting system 510 comprises a laser spotting device 512 and an adjustable stationary cycling machine 14. The laser spotting device 512 comprises a base member 516 and the laser emitting device 18 movably attached to the base member 516 in the X-direction (one example of the first direction) and the Y-direction. The base member 516 includes a first part 520 and a second part 522. The first part 520 is configured to be placed on a floor, for example. The first part 520 includes a first column 524 and a second column 526. The first and second columns 524 and 526 extend in the Y-direction and are spaced apart from each other in the X-direction. The second part 522 is movably attached to the first part 520 in the Y-direction (one example of the second direction) which is perpendicular to the X-direction. The second part 522 is movably attached to the first column 524 and the second column 526 in the Y-direction. The laser emitting device 18 is attached to the second part 522. More specifically, the second part the laser emitting device 18 is movably attached to the second part 522 in the X-direction. The second part 522 extends in the X-direction to guide the laser emitting device 18 in the X-direction. Accordingly, the laser emitting device 18 is movable relative to the first part 520 of the base member 16 in the X-direction and the Y-direction.

With the laser spotting device 512 of the first embodiment, since the laser emitting device 18 is configured to emit laser beam toward the first virtual plane P1 and to emit laser beam toward the second virtual plane P2 as well as the first embodiment, the preferable positions of the adjustable bicycle components can be easily measured and applied to the object bicycle 100. It will be apparent to those skilled in the bicycle field that the adjustable stationary cycling machine 14 can be replaced the usual bicycles. In such embodiment, the adjusted preferable positions of the adjustable bicycle components of one bicycle can be easily measured and applied to the other bicycle using the laser spotting device 512.

The term "attached" or "attaching", as used herein, encompasses configurations in which an element directly attached to another element by affixing the element is directly to the other element; configurations in which the element is indirectly attached to the other element via the intermediate member(s); and configurations in which one element is integral with another element, i.e. one element is essentially part of the other element. This definition also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This definition also applies to words of similar meaning, for example, the terms "have", "include" and their derivatives.

The terms "member", "section," "portion," "part" or "element" when used in the singular can have the dual meaning of a single part or a plurality of parts.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A laser spotting device for bicycle fitting, comprising:
a base member;
a frame connected to the base member, the frame having a crank having a first rotational axis; and
a laser emitting device movable in a first direction and attached to the base member, the laser emitting device configured to emit laser beam toward the frame which is arranged at a first virtual plane which is parallel to the first direction, the laser emitting device configured to emit laser beam toward a target bicycle frame having a crank having a second rotational axis and which is arranged at a second virtual plane which is parallel to the first direction and the second virtual plane being spaced apart from the first virtual plane.

2. The laser spotting device according to claim 1, wherein the base member includes a first part and a second part movably attached to the first part in a second direction which is perpendicular to the first direction, and
the laser emitting device is attached to the second part.

3. The laser spotting device according to claim 1, further comprising:
a detecting device configured to detect coordinates of the laser emitting device from initial coordinates of the laser emitting device.

4. The laser spotting device according to claim 3, wherein the detecting device is configured such that the initial coordinates are resettable.

5. The laser spotting device according to claim 1, wherein the laser emitting device includes
a first laser emitter configured to emit laser beam toward the first virtual plane, and
a second laser emitter configured to emit the laser beam toward the second virtual plane.

6. The laser spotting device according to claim 5, wherein the second laser emitter is configured to emit laser beam in a direction opposite to a direction in which the first laser emitter emits laser beam.

7. The laser spotting device according to claim 1, wherein the laser emitting device includes
a laser emitter having a laser output portion, and
a carrier configured to movably attach the laser emitter to the base member, the carrier being configured to change orientation of the laser output portion relative to the carrier such that the laser emitter emits laser beam toward each of the first virtual plane and the second virtual plane.

8. The laser spotting device according to claim 7, wherein the carrier is configured to change the orientation of the laser output portion between a first orientation and a second orientation which is opposite to the first orientation.

9. A bicycle fitting system comprising:
the laser spotting device according to claim 1; and
an adjustable stationary cycling machine connected to the base member of the laser spotting device and arranged at the first virtual plane, the adjustable stationary cycling machine including the frame connected to the base member.

10. The bicycle fitting system according to claim 9, wherein
the laser emitting device is provided between the first virtual plane and the second virtual plane.

11. The bicycle fitting system according to claim 9, wherein
the base member includes a first part and a second part movably attached to the first part in one of the first direction and a second direction which is perpendicular to the first direction,
the frame is connected to the first part, and
the laser emitting device is movably attached to the second part in another of the first direction and the second direction.

12. The bicycle fitting system according to claim 11, wherein
the laser emitting device is provided between the first virtual plane and the second virtual plane in a third direction perpendicular to each of the first direction and the second direction.

13. The bicycle fitting system according to claim 11, wherein
the first rotational axis is substantially parallel to a third direction perpendicular to each of the first direction and the second direction.

14. The bicycle fitting system according to claim 9, wherein
the adjustable stationary cycling machine includes a first crank assembly rotatably attached to the frame about the first rotational axis.

15. The laser spotting device according to claim 1, wherein the laser emitting device is provided between the first virtual plane and the second virtual plane.

16. The laser spotting device according to claim 1, wherein the base member includes a first part and a second part movably attached to the first part in one of the first direction and a second direction which is perpendicular to the first direction, and
the laser emitting device is movably attached to the second part in another of the first direction and the second direction.

17. The laser spotting device according to claim 16, wherein
the laser emitting device is provided between the first virtual plane and the second virtual plane in a third direction perpendicular to each of the first direction and the second direction.

\* \* \* \* \*